(12) United States Patent
LeCrone et al.

(10) Patent No.: US 9,927,980 B1
(45) Date of Patent: Mar. 27, 2018

(54) ACCESSING POINT IN TIME VERSIONS OF A LOGICAL DEVICE IN CONNECTION WITH I/O OPERATIONS

(71) Applicant: EMC Corporation, Hopkinton, MA (US)

(72) Inventors: Douglas E. LeCrone, Hopkinton, MA (US); Paul A. Linstead, Shrewsbury, MA (US); Evan G. Jones, Milford, MA (US); Eugene D. Pflueger, Medfield, MA (US); Amir Holtzman, Sharon, MA (US); Ning Wu, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/086,581

(22) Filed: Mar. 31, 2016

(51) Int. Cl.
*G06F 12/00* (2006.01)
*G06F 13/00* (2006.01)
(Continued)

(52) U.S. Cl.
CPC ............ *G06F 3/0608* (2013.01); *G06F 3/067* (2013.01); *G06F 3/0647* (2013.01);
(Continued)

(58) Field of Classification Search
CPC ..... G06F 2003/0691; G06F 2003/0692; G06F 2003/0694; G06F 2003/0695; G06F 2003/0697; G06F 2003/0698; G06F 11/00; G06F 11/14; G06F 11/1402–11/1466; G06F 11/1469; G06F 11/1471–11/1497; G06F 11/16–11/2097; G06F 17/00; G06F 17/30–17/30997;
(Continued)

(56) References Cited

U.S. PATENT DOCUMENTS 5,423,046 A * 6/1995 Nunnelley .............. G06F 1/206
711/114
5,625,817 A * 4/1997 Wood .................. G06F 11/1469
(Continued)

OTHER PUBLICATIONS

Douglas E. LeCrone, et al., "Incremental Continuous Data Protection," U.S. Appl. No. 14/133,929, filed Dec. 19, 2013.

*Primary Examiner* — Daniel C Chappell
(74) *Attorney, Agent, or Firm* — Muirhead and Saturnelli, LLC

(57) ABSTRACT

Systems and techniques are provided for incremental Continuous Data Protection (iCDP) as a process to secure frequent, and space efficient, versions of consistent point-in-time images of a group of volumes using snapshot technology. The system provides for automation to create and manage frequent snapshots of defined groups of volumes. The incremental approach of the system described herein provides a convenient way to roll back to prior point-in-time versions to investigate data damage due to processing errors or other forms of corruption. Log space in log devices may be reclaimed in connection with managing recovery and roll back capabilities of the system to desired data versions for purposes of data protection. Point in time versions of a source device may be accessed through the source device. The particular point in time version accessed in servicing an I/O may be determined in accordance with one or more criteria.

20 Claims, 18 Drawing Sheets

(51) Int. Cl.
*G06F 13/28* (2006.01)
*G06F 3/06* (2006.01)
*G06F 11/14* (2006.01)

(52) U.S. Cl.
CPC .......... *G06F 3/0653* (2013.01); *G06F 3/0683* (2013.01); *G06F 11/1469* (2013.01); *G06F 2201/84* (2013.01)

(58) Field of Classification Search
CPC ...... G06F 2201/00–2201/835; G06F 2201/84; G06F 2201/845–2201/885; G06F 2203/00; G06F 2206/00–2206/20; G06F 2211/00–2211/902; G06F 2212/00–2212/7211; G06F 3/00; G06F 3/06; G06F 3/0601; G06F 3/0602; G06F 3/0608; G06F 3/0614; G06F 3/0628; G06F 3/0641; G06F 3/0646; G06F 3/0647; G06F 3/0649; G06F 3/065; G06F 3/0652; G06F 3/0653; G06F 3/0662; G06F 3/0664; G06F 3/0665; G06F 3/0667; G06F 3/0668; G06F 3/067; G06F 3/0671–3/0683; G06F 3/0685–3/0689
See application file for complete search history.

(56) References Cited

U.S. PATENT DOCUMENTS

| | | | |
|---|---|---|---|
| 5,649,152 A * | 7/1997 | Ohran | G06F 11/1451 711/114 |
| 6,038,639 A * | 3/2000 | O'Brien | G06F 11/1435 711/114 |
| 6,101,585 A * | 8/2000 | Brown | G06F 11/1451 707/999.202 |
| 6,205,450 B1 * | 3/2001 | Kanome | G06F 11/1435 707/649 |
| 6,212,531 B1 * | 4/2001 | Blea | G06F 11/1456 |
| 6,269,431 B1 * | 7/2001 | Dunham | G06F 11/1469 707/999.202 |
| 6,366,986 B1 | 4/2002 | St Pierre et al. | |
| 6,594,744 B1 * | 7/2003 | Humlicek | G06F 3/0601 707/999.202 |
| 7,054,883 B2 | 5/2006 | Meiri et al. | |
| 7,340,489 B2 | 3/2008 | Vishlitzky et al. | |
| 7,475,207 B2 | 1/2009 | Bromling et al. | |
| 7,558,926 B1 | 7/2009 | Oliveira et al. | |
| 7,702,865 B2 * | 4/2010 | Yamakawa | G06F 3/061 711/154 |
| 7,716,171 B2 * | 5/2010 | Kryger | G06F 17/30613 707/649 |
| 7,716,435 B1 | 5/2010 | Allen | |
| 7,779,291 B2 | 8/2010 | Yoder et al. | |
| 7,849,352 B2 * | 12/2010 | Soran | G06F 3/0608 714/5.11 |
| 8,046,545 B2 | 10/2011 | Meiri et al. | |
| 8,151,069 B1 | 4/2012 | Blitzer et al. | |
| 8,239,584 B1 * | 8/2012 | Rabe | G06F 3/0605 710/8 |
| 8,250,033 B1 | 8/2012 | De Souter et al. | |
| 8,352,431 B1 | 1/2013 | Protopopov et al. | |
| 8,515,911 B1 | 8/2013 | Zhou et al. | |
| 8,832,024 B2 * | 9/2014 | Knight | G06F 3/0608 707/610 |
| 8,943,282 B1 * | 1/2015 | Armangau | G06F 17/30088 711/126 |
| 9,128,901 B1 | 9/2015 | Nickurak et al. | |
| 9,170,904 B1 | 10/2015 | LeCrone et al. | |
| 9,665,307 B1 * | 5/2017 | LeCrone | G06F 3/065 |
| 2005/0065986 A1 * | 3/2005 | Bixby | G06F 17/30088 |
| 2007/0043790 A1 * | 2/2007 | Kryger | G06F 11/1448 |
| 2007/0220225 A1 * | 9/2007 | Nakamura | G06F 3/0608 711/162 |
| 2014/0344539 A1 * | 11/2014 | Gordon | G06F 3/065 711/162 |
| 2015/0089509 A1 * | 3/2015 | Brown | G06F 9/5016 718/103 |
| 2017/0075772 A1 * | 3/2017 | Beeken | G06F 11/1469 |
| 2017/0075773 A1 * | 3/2017 | Beeken | G06F 11/1469 |
| 2017/0075774 A1 * | 3/2017 | Beeken | G06F 11/1469 |
| 2017/0083404 A1 * | 3/2017 | Beeken | G06F 11/1451 |

* cited by examiner

FIG. 8

| Track | |
|---|---|
| 1 | D1 |
| 2 | D2 |
| 3 | D3 |
| 4 | D4 |
| 5 | D5 |

→ LOG 302

FIG. 9

| Track | | V1 |
|---|---|---|
| 1 | D1 | D1 |
| 2 | D2 | D2 |
| 3 | D3 | D3 |
| 4 | D4 | D4 |
| 5 | D5 | D5 |

→ LOG 302

FIG. 10

| Track | | V1 | V2 | V3 | V4 |
|---|---|---|---|---|---|
| 1 | D1 | D1 | D1 | D1 | D1 |
| 2 | D2 | D2 | D2 | D2 | D2 |
| 3 | D3' | D3 | D3 | D3 | W1 |
| 4 | D4 | D4 | D4 | D4 | D4 |
| 5 | D5 | D5 | D5 | D5 | D5 |

→ ENTRY 302a / LOG 302

FIG. 11

| Track | | V1 | V2 | V3 | V4 | V5 | V6 | V7 | V8 |
|---|---|---|---|---|---|---|---|---|---|
| 1 | D1 | D1 | D1 | D1 | D1 | D1 | D1 | D1 | D1 |
| 2 | D2 | D2 | D2 | D2 | D2 | D2 | D2 | D2 | D2 |
| 3 | D3'' | D3 | D3 | D3 | W1 | W1 | W1 | W1 | W2 |
| 4 | D4 | D4 | D4 | D4 | D4 | D4 | D4 | D4 | D4 |
| 5 | D5 | D5 | D5 | D5 | D5 | D5 | D5 | D5 | D5 |

→ ENTRY 302a / ENTRY 302b / LOG 302

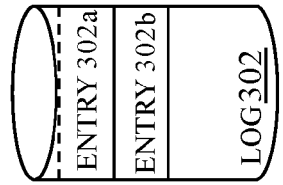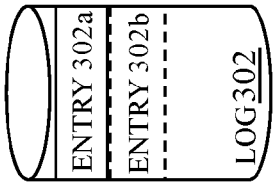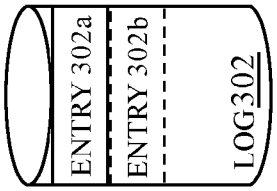
FIG. 12
FIG. 13
FIG. 14

FIG. 15

| Track | | V1 | V2 | V3 | V4 | V5 | V6 | V7 | V8 |
|---|---|---|---|---|---|---|---|---|---|
| 1 | D1 | D1 | D1 | D1 | D1 | D1 | D1 | D1 | D1 |
| 2 | D2' | D2 | D2 | D2 | D2 | D2 | D2 | D2 | W2 |
| 3 | D3' | D3 | D3 | D3 | W1 | W1 | W1 | W1 | W1 |
| 4 | D4 | D4 | D4 | D4 | D4 | D4 | D4 | D4 | D4 |
| 5 | D5 | D5 | D5 | D5 | D5 | D5 | D5 | D5 | D5 |

LOG 402: ENTRY 402a, ENTRY 402b

FIG. 16

| Track | | V4 | V5 | V6 | V7 | V8 |
|---|---|---|---|---|---|---|
| 1 | D1 | D1 | D1 | D1 | D1 | D1 |
| 2 | D2' | D2 | D2 | D2 | D2 | D2 |
| 3 | D3' | W1 | W1 | W1 | W1 | W2 |
| 4 | D4 | D4 | D4 | D4 | D4 | D4 |
| 5 | D5 | D5 | D5 | D5 | D5 | D5 |

LOG 402: ENTRY 402a, ENTRY 402b

FIG. 17

| Track | | V3 | V4 | V8 |
|---|---|---|---|---|
| 1 | D1 | D1 | D1 | D1 |
| 2 | D2' | D2 | D2 | W2 |
| 3 | D3' | D3 | W1 | W1 |
| 4 | D4 | D4 | D4 | D4 |
| 5 | D5 | D5 | D5 | D5 |

LOG 502: ENTRY 502a, ENTRY 502b

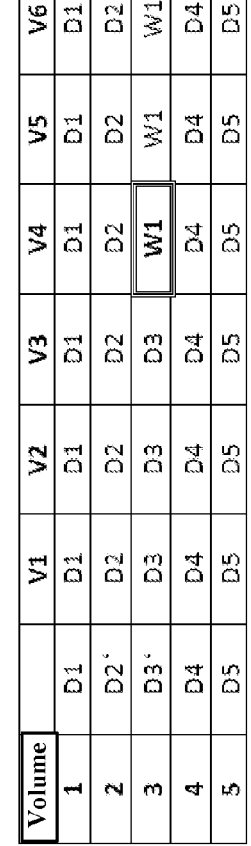
FIG. 18
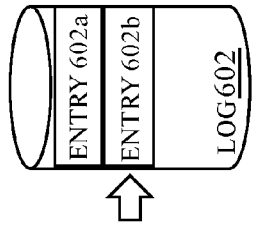
FIG. 19

ACCESSING POINT IN TIME VERSIONS OF A LOGICAL DEVICE IN CONNECTION WITH I/O OPERATIONS

TECHNICAL FIELD

This application relates to data storage, and more particularly to the field of maintaining copies of data such as in data storage systems.

BACKGROUND

Host processor systems may store and retrieve data from a data storage system containing a plurality of host interface units (host adapters), disk drives, and disk interface units (disk adapters). Such data storage systems are provided, for example, by EMC Corporation of Hopkinton, Mass. The host systems access the data storage system through a plurality of channels provided therewith. Host systems provide data and access control information through the channels of the data storage system and the data storage system data to the host systems also through the channels. The host systems do not address the disk drives of the data storage system directly, but rather, access what appears to the host systems as a plurality of logical volumes. The logical volumes may or may not correspond to the actual disk drives.

Point-in-time image technologies are used in storage systems to record contents of storage objects at a given moment in time, and may be useful for many reasons, including data protection. An example of a logical point-in-time image version of a logical volume is a snapshot copy that may be obtained relatively quickly and without significant overhead by creating a data structure initially containing pointers that point to sections of the logical volume. As data is written to sections of the logical volume (e.g., tracks) two different versions of data are maintained. A first version of the data represents the original data that existed when the snapshot was initiated and a second version of the data represents the new data being written. There are many different specific mechanisms for providing snapshot copies, and reference is made, for example, to U.S. Pat. No. 8,515,911 to Zhou et al., entitled "Methods and Apparatus for Managing Multiple Point In Time Copies in a File System," U.S. Pat. No. 8,352,431 to Protopopov et al., entitled "Fine-Grain Policy-Based Snapshots," U.S. Pat. No. 8,151,069 to Blitzer et al., entitled "Multiprotection for Snapshots," U.S. Pat. No. 7,716,435 to Allen, entitled "Protection of Point-In-Time Application Data Using Snapshot Copies of a Logical Volume," and U.S. Pat. No. 7,340,489 to Vishlitzky et al., entitled "Virtual Storage Devices," which are all incorporated herein by reference. Unless otherwise specified, the term "snapshot" as used herein should be understand to refer generally to any appropriate point-in-time image technique.

Snapshots may be useful for recovering from logical errors. For example, if a logical device contains data for a database for which a snapshot is made at 10:00 a.m., and a user inadvertently erases important data at 11:00 a.m. (or a program error causes corruption of the data for the database), then it is possible to recover the 10:00 a.m. version of the data using the snapshot. Note also that, since a snapshot may be initiated by creating a table of pointers to actual data, then there may be relatively little overhead/time associated with creating a snapshot.

Differential data protection (or backup) systems using snapshots are known in which only some segments of data in a primary copy are backed up. A complete copy of a backed up element may be made from an earlier backup and a subsequent differential backup. A differential snapshot does not replicate a full copy of the data set (referred to as a production data set). Rather, the snapshot only stores differences between a current version of the production data set and the version of the data set at the point in time when the snapshot was taken. For further discussions of differential data protection systems, reference is made, for example, to U.S. Pat. No. 8,250,033 to De Souter et al., entitled "Replication of a Data Set Using Differential Snapshots," and U.S. Pat. No. 6,366,986 to St. Pierre et al., entitled "Method and Apparatus for Differential Backup in a Computer Storage System," which are incorporated herein by reference. For example, EMC Corporation's Symmetrix products may include a mechanism called Symmetrix Differential Data Facility (SDDF) that is a mechanism used to differentially track changes to volumes in remote Symmetrix arrays. SDDF allows differential resynchronization between the remote Symmetrix arrays in the event of a loss of the primary site array.

Continuous snapshotting (CS) refers to a process of taking snapshots of any content change in a storage system. In connection with the content being user data, the process may be referred to as continuous data protection (CDP). In a CS/CDP implementation, individual writes to storage are duplicated and stored in a log of activity in one or more journal devices. By replaying these writes in reverse, storage may be "rolled back" (a roll-back) or reverted to any past state which was covered by the logs. This may be done on production storage, or in a duplicate copy of the storage to avoid disruption to users of the production storage. In the latter case, when access to historic data is no longer required, the log may be replayed again in forward order (a roll-forward) to restore the duplicate to the production state and possibly including logged writes that occurred since roll-back. An example of a product that provides continuous data protection with multiple recovery points to restore applications instantly to a specific point in time is RecoverPoint by EMC Corporation.

For further discussion of techniques for providing continuous data protection, reference is made, for example, to U.S. Pat. No. 8,046,545 to Meiri et al., entitled "Continuous Backup," which discloses a system for providing continuous backup of a storage device and restoring the storage device to prior states; U.S. Pat. No. 7,558,926 to Oliveira et al., entitled "Continuous Data Backup Using Distributed Journaling," which discloses techniques for providing continuous data backups of primary storage using distributed journals. The above-noted references are incorporated herein by reference.

Accordingly, it would be desirable to provide data protection techniques and systems that efficiently facilitate the creating, managing, operating and monitoring of data backup and recovery elements for continuous data protection.

SUMMARY OF THE INVENTION

In accordance with one aspect of techniques disclosed herein is a method of processing I/O operations. An I/O operation is received from an application. The I/O operation is directed to a logical device having a plurality of point in time versions. It is determined, in accordance with one or more criteria, whether to direct the I/O operation to the logical device or one of the plurality of point in time versions of the logical device. Responsive to determining to direct the I/O operation to a point in time version of the logical device, first processing is performed. The first processing includes selecting, in accordance with the one or more criteria, a first of a plurality of point in time versions of the logical device. The first processing includes performing the I/O operation with respect to the first point in time version of the logical device. The plurality of point in time versions may each denote a prior point in time copy of the logical device.

In accordance with another aspect of techniques herein is a computer readable medium comprising code stored thereon that, when executed, performs a method of processing I/O operations. An I/O operation is received from an application. The I/O operation is directed to a logical device having a plurality of point in time versions. It is determined, in accordance with one or more criteria, whether to direct the I/O operation to the logical device or one of the plurality of point in time versions of the logical device. Responsive to determining to direct the I/O operation to a point in time version of the logical device, first processing is performed. The first processing includes selecting, in accordance with the one or more criteria, a first of a plurality of point in time versions of the logical device. The first processing includes performing the I/O operation with respect to the first point in time version of the logical device. The plurality of point in time versions may each denote a prior point in time copy of the logical device.

In accordance with yet another aspect of techniques herein is a system comprising a process, and a memory comprising code stored thereon that, when executed, performs a method of processing I/O operations. The method includes receiving an I/O operation from an application where the I/O operation is directed to a logical device having a plurality of point in time versions, determining, in accordance with one or more criteria, whether to direct the I/O operation to the logical device or one of the plurality of point in time versions of the logical device, and responsive to determining to direct the I/O operation to a point in time version of the logical device, performing first processing. The first processing further includes selecting, in accordance with the one or more criteria, a first of a plurality of point in time versions of the logical device, and performing the I/O operation with respect to the first point in time version of the logical device. The plurality of point in time versions may each denote a prior point in time copy of the logical device.

BRIEF DESCRIPTION OF THE DRAWINGS

Embodiments of the techniques described herein are explained with reference to the several figures of the drawings, which are briefly described as follows.

FIGS. 8-11 are schematic illustrations showing representations of devices in connection with a data protection system using a log device according to an embodiment of the system described herein.

FIGS. 12-14 show scenario representations according to an embodiment of the system described herein for reclamation processing of a subject device to reclaim log capacity.

FIGS. 15 and 16 show scenario representations according to an embodiment of the system described herein for reclamation of a subject device when multiple tracks are involved to reclaim log capacity.

FIG. 17 is a schematic representation according to the embodiment of the system described herein shown in FIG. 15 in which versions have been terminated, but all unique first write pre-write images in each version interval are preserved.

FIGS. 18 and 19 show scenario representations according to an embodiment of the system described herein for reclamation of a subject device when multiple volumes are involved to reclaim log capacity.

DETAILED DESCRIPTION OF VARIOUS EMBODIMENTS

Figure 1:
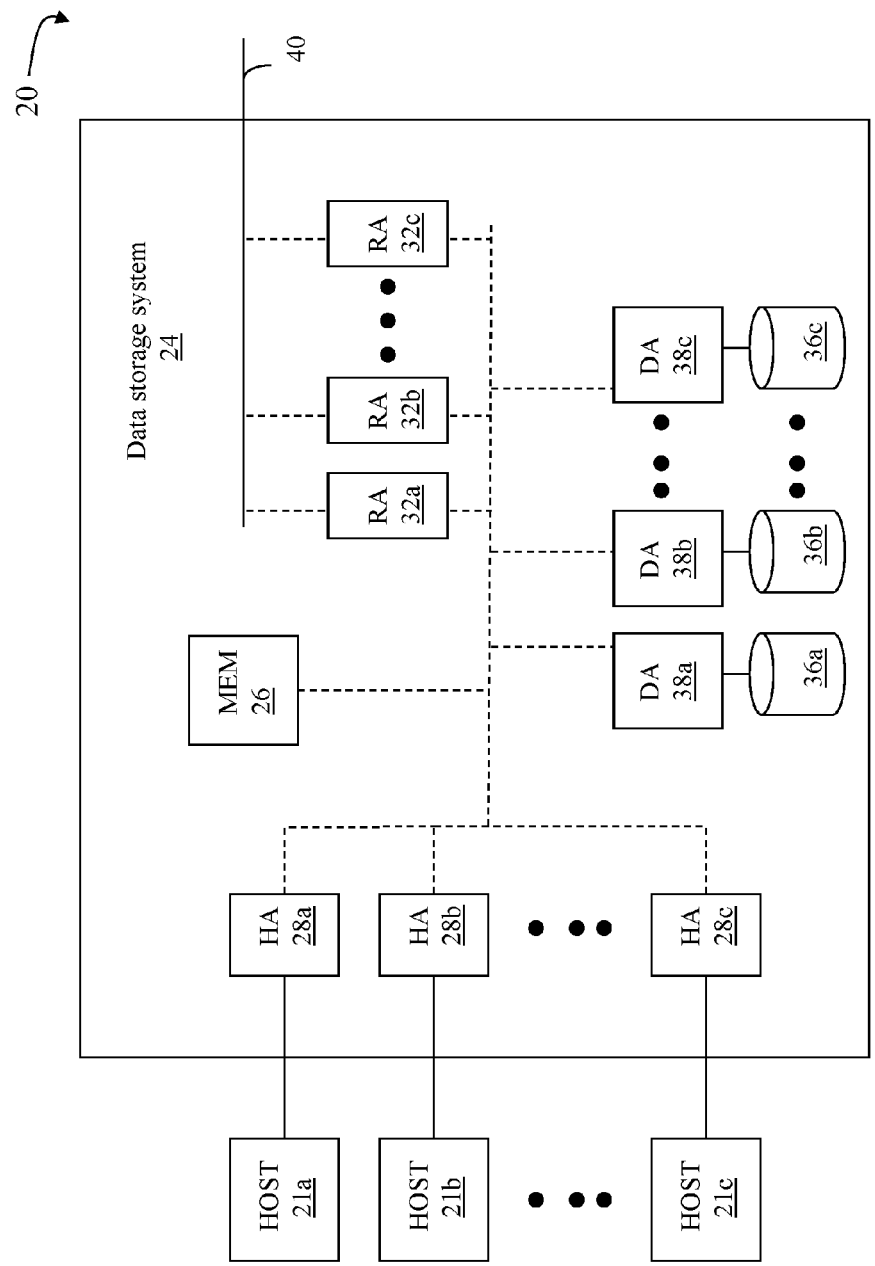
FIG. 1 is a schematic diagram showing a plurality of hosts coupled to a data storage system that may be used in connection with an embodiment of the system described herein.

FIG. 1 is a schematic diagram 20 showing a plurality of hosts 21*a*-21*c* coupled to a data storage system 24 that may be used in connection with an embodiment of the system described herein. The data storage system 24 includes a memory 26 that facilitates operation of the storage system 24, as further described elsewhere herein. The data storage system also includes a plurality of host adapters (HA's) 28*a*-28*c* that handle reading and writing of data between the hosts 21*a*-21*c* and the storage system 24. Although the diagram 20 shows each of the hosts 21*a*-21*c* coupled to each of the HA's 28a-28c, it will be appreciated by one of ordinary skill in the art that one or more of the HA's 28a-28c may be coupled to other hosts. In various embodiments, the data storage system 24 may be a Symmetrix data storage system, a CLARiiON data storage system and/or a VPLEX product produced by EMC Corporation of Hopkinton, Mass., although the system described herein may also operate in connection with any other suitable storage device and products.

In an embodiment, the data storage system 24 may include one or more Remote Data Facility (RDF) adapter units (RA's) 32a-32c. An RDF product produced by EMC Corporation, may be used to copy data from one storage system or component to another. For example, if a host writes data to a first storage device on a first data storage system (e.g., a local storage device on a local storage system), it may be desirable to copy that data to a second storage device on a second data storage system provided in a different location (e.g., a remote storage device on a remote storage system). The RA's 32a-32c are coupled to an RDF link 40 and are similar to the HA's 28a-28c, but are used to transfer data between the data storage system 24 and other data storage systems that are also coupled to the RDF link 40. The data storage system 24 may be coupled to additional RDF links (not shown) in addition to the RDF link 40. For further discussion of example RDF systems and the use thereof in data storage and recovery techniques, see, for example, U.S. Pat. No. 7,779,291 to Yoder et al., entitled "Four Site Triangular Asynchronous Replication," which is incorporated herein by reference.

The data storage system 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the data storage system 24 that corresponds to the disks 36a-36c may be subdivided into a plurality of volumes or logical devices. The logical storage space may also be merged in connection with use of a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 21a-21c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The data storage system 24 may be provided as a stand-alone storage system coupled to the hosts 21a-21c as shown in FIG. 1 or, alternatively, the data storage system 24 may be part of, and/or otherwise coupled to, a storage area network (SAN) that may include a plurality of other storage system as well as switches, routers, network connections, etc., as further discussed elsewhere herein.

Figure 2:
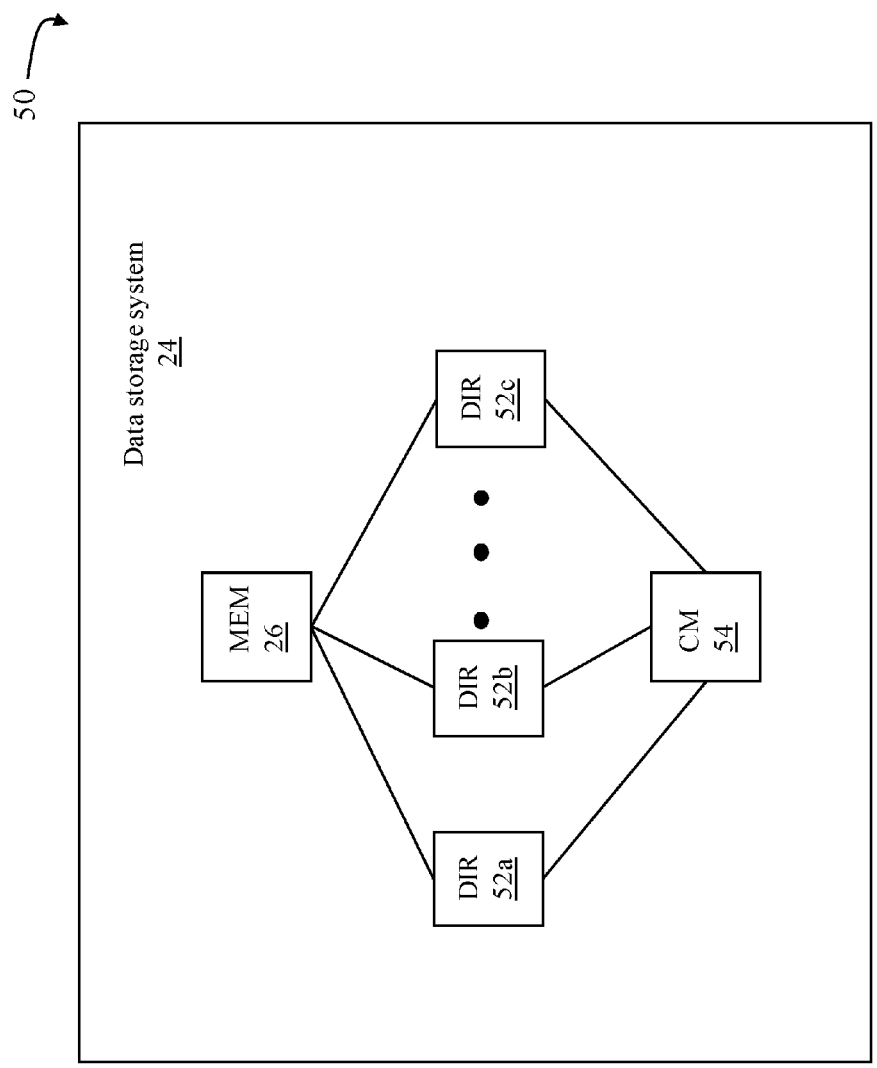
FIG. 2 is a schematic diagram illustrating an embodiment of the data storage system where each of a plurality of directors are coupled to the memory.

FIG. 2 is a schematic diagram 50 illustrating an embodiment of the data storage system 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one data storage system and accessible by each of the data storage systems.

Note that, although specific data storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more data storage systems in a manner that allows reconfiguring connections without having to physically disconnect and reconnect cables from and to ports of the systems. A storage area network may be implemented using one or more switches to which the data storage systems and the host systems are coupled. The switches may be programmed to allow connections between specific ports of systems coupled to the switches. A port that can initiate a data-path connection may be called an "initiator" port while the other port may be deemed a "target" port.

Figure 3:
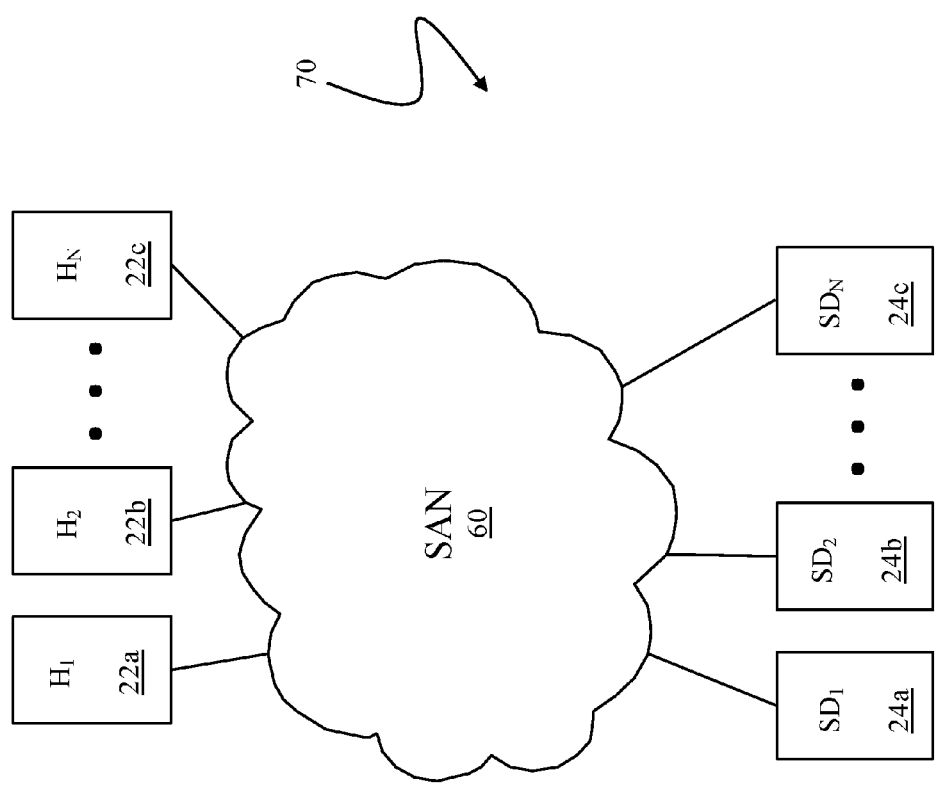
FIG. 3 is a schematic illustration showing a storage area network (SAN) providing a SAN fabric coupling a plurality of hosts to a plurality of data storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of data storage systems ($SD_1$-$SD_N$) 24a-c that may be used in connection with an embodiment of the system described herein. Each of the systems 22a-c, 24a-c may have a corresponding port that is physically coupled to switches of the SAN fabric used to implement the storage area network 60. The switches may be separately programmed by one of the systems 22a-c, 24a-c or by a different systems (not shown). Programming the switches may include setting up specific zones that describe allowable data-path connections (which ports may form a data-path connection) and possible allowable initiator ports of those configurations. For example, there may be a zone for connecting the port of the host 22a with the port of the data storage system 24a. Upon becoming activated (e.g., powering up), the host 22a and the data storage system 24a may send appropriate signals to the switch(es) of the storage area network 60, and each other, which then allows the host 22a to initiate a data-path connection between the port of the host 22a and the port of the data storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among data storage system, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

Figure 4:
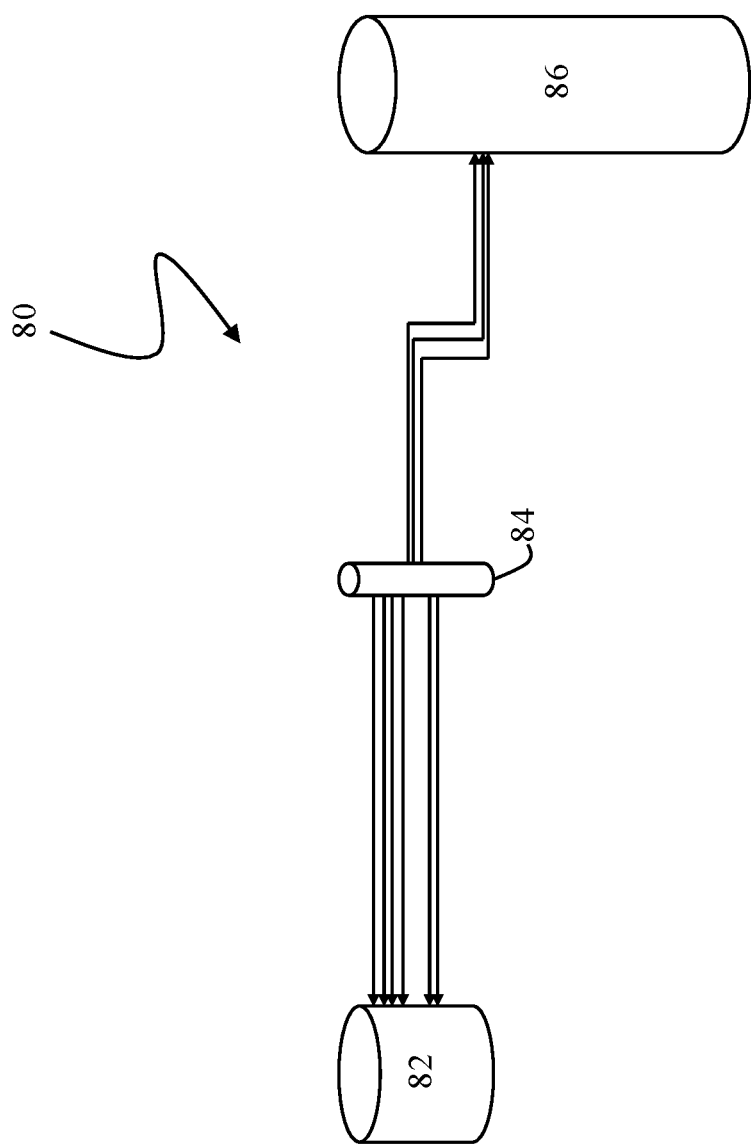
FIG. 4 is a schematic diagram showing a standard logical device, a point-in-time image device, and a journal (or log) device that may be used in connection with an embodiment of the system described herein

FIG. 4 is a schematic diagram 80 showing a standard logical device 82, a point-in-time image device 84, such as a snapshot image device and/or other appropriate point-in-time image device, and a journal (or log) device 86 that may be used in connection with an embodiment of the system described herein. The standard logical device 82 may be implemented using any appropriate storage logical device mechanism, such as logical storage devices used on a Symmetrix and/or VPLEX product provided by EMC Corporation, and used to access corresponding physical storage disks, like disks 36a-c (see FIG. 1). Similarly, the point-in-time image device 84 may be any logical or virtual device that can provide point-in-time image (or version) functionality for the logical device 82. As discussed herein, the point-in-time image device 84 may represent a point-in-time image of all or a portion of the standard logical device 82. A host coupled to a storage device that accesses the point-in-time image device 84 may access the point-in-time image device 84 in the same way that the host would access the standard logical device 82. However, the point-in-time image device 84 does not contain any track data from the standard logical device 82. Instead, the point-in-time image device 84 includes a plurality of table entries that point to tracks on either the standard logical device 82 or the journal device 86.

When the point-in-time image device 84 is established (e.g., when a point-in-time image is made of the standard logical device 82), the point-in-time image device 84 is created and provided with appropriate table entries that, at the time of establishment, point to tracks of the standard logical device 82. A host accessing the point-in-time image device 84 to read a track would read the appropriate track from the standard logical device 82 based on the table entry of the point-in-time image device 84 pointing to the track of the standard logical device 82.

After the point-in-time image device 84 has been established, it is possible for a host to write data to the standard logical device 82. In that case, the previous data that was stored on the standard logical device 82 may be copied to the journal device 86 and the table entries of the point-in-time image device 84 that previously pointed to tracks of the standard logical device 82 would be modified to point to the new tracks of the journal device 86 to which the data had been copied. Thus, a host accessing the point-in-time image device 84 may read either tracks from the standard logical device 82 that have not changed since the point-in-time image device 84 was established or, alternatively, may read corresponding tracks from the journal device 86 that contain data copied from the standard logical device 82 after the point-in-time image device 84 was established. Adjusting data and pointers in connection with reads and writes to and from the standard logical device 82 and journal device 84 is discussed in more detail elsewhere herein.

In an embodiment described herein, hosts may not have direct access to the journal device 86. That is, the journal device 86 would be used exclusively in connection with the point-in-time image device 84 (and possibly other point-in-time image devices as described in more detail elsewhere herein). In addition, for an embodiment described herein, the standard logical device 82, the point-in-time image device 84, and the journal device 86 may be provided on the single storage device 24. However, it is also possible to have portions of one or more of the standard logical device 82, the point-in-time image device 84, and/or the journal device 86 provided on separate data storage system that are appropriately interconnected.

It is noted that the system described herein may be used with data structures and copy mechanisms other than tables and/or pointers to tracks discussed, for example, in connection with snapshots and/or other point-in-time images. For example, the system described herein may also operate in connection with use of clones and/or deep copy backups automatically synchronized between data and metadata. Accordingly, the system described herein may be applied to any appropriate point-in-time image processing systems and techniques, and it should be understood that the discussions herein with respect to the creation and use of "snapshots," and the devices thereof, may be equally applied to the use of any appropriate point-in-time image used for point-in-time image processes in connection with protection of data and configuration metadata that enable the rolling back/forward of a storage system using the point-in-time images of the data and configuration metadata according to the system described herein.

Figure 5:
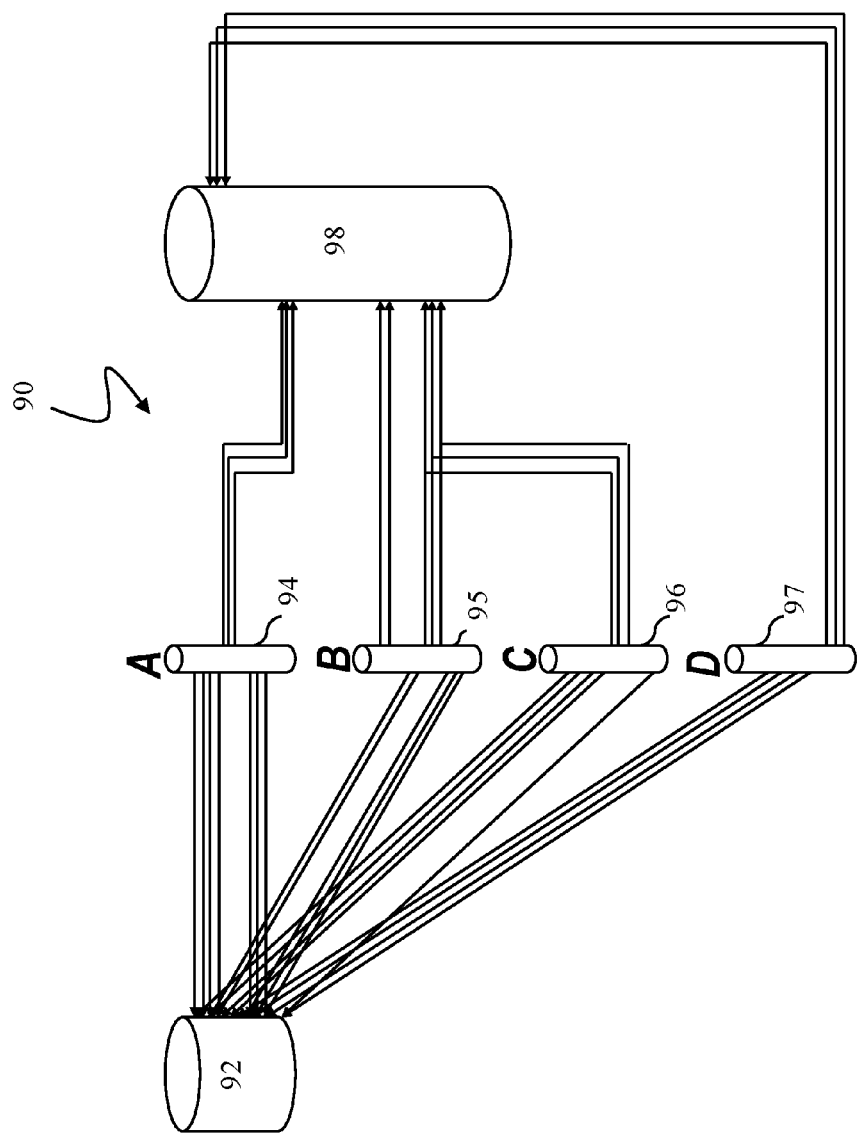
FIG. 5 is a schematic diagram showing another example of the use of virtual devices including a standard logical device, a plurality of point-in-time image devices and a journal device that may be used in connection with an embodiment of the system described herein.

FIG. 5 is a schematic diagram 90 showing another example of the use of virtual devices including a standard logical device 92, a plurality of point-in-time images 94-97 that may be generated by one or more point-in-time devices and a journal device 98 that may be used in connection with an embodiment of the system described herein. In the illustrated example, a point-in-time image 94 represents a point-in-time version of the standard logical device 92 taken at time A. Similarly, a point-in-time image of point-in-time image 95 represents a point-in-time version of the standard logical device 92 taken at time B, a point-in-time image 96 represents a point-in-time version of the standard logical device 92 taken at time C, and a point-in-time image 97 represents a point-in-time version of the standard logical device 92 taken at time D. Note that all of the point-in-time image 94-97 may share use of the journal device 98. In addition, it is possible for table entries of more than one of the point-in-time images 94-97, or, a subset of the table entries of the point-in-time image 94-97, to point to the same tracks of the journal device 98. For example, the point-in-time image 95 and the point-in-time image 96 are shown in connection with table entries that point to the same tracks of the journal device 98.

In an embodiment discussed herein, the journal device 98, and/or other journal devices discussed herein, may be provided by a pool of journal devices that are managed by the data storage system 24 and/or other controller coupled to the SAN. In that case, as a point-in-time image device requires additional tracks of a journal device, the point-in-time image device would cause more journal device storage to be created (in the form of more tracks for an existing journal device or a new journal device) using the journal device pool mechanism. Pooling data storage system resources in this manner is known in the art. Other techniques that do not use pooling may be used to provide journal device storage.

Figure 6:
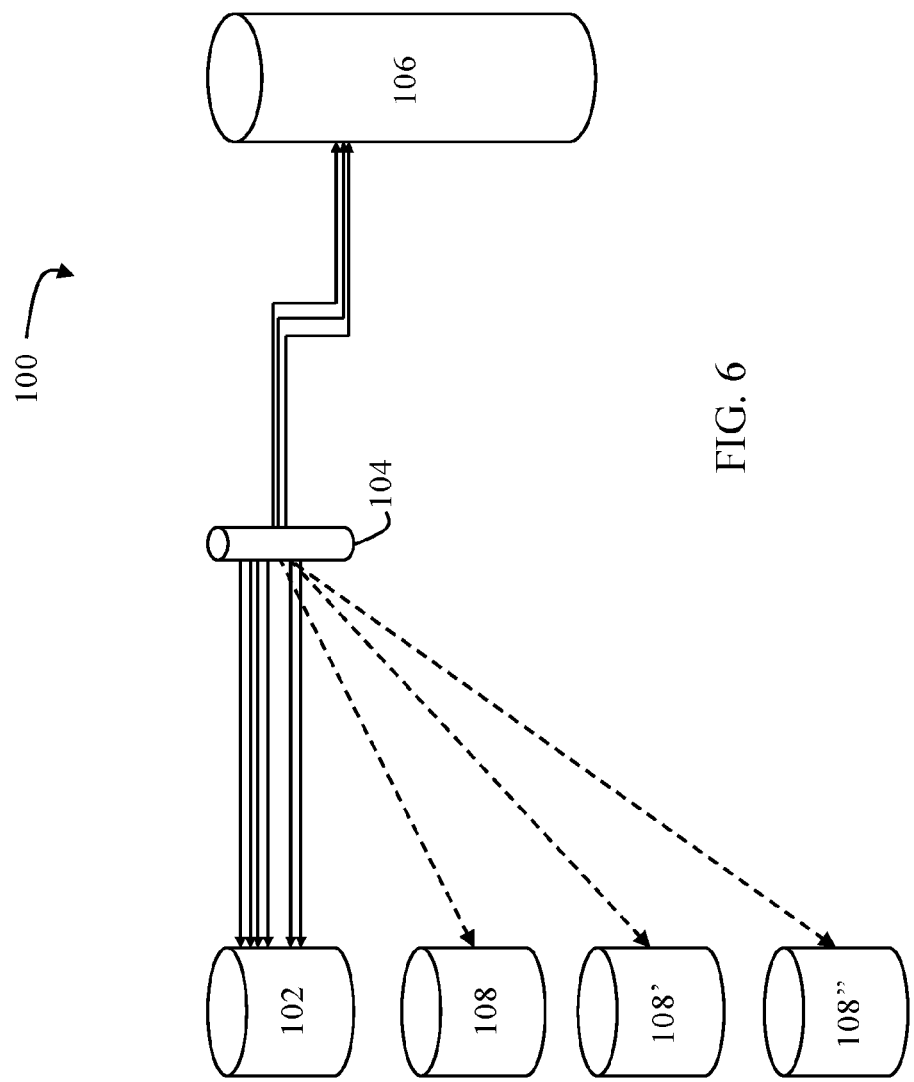
FIG. 6 is a schematic diagram that illustrates a system including a logical device, a point-in-time image device, a journal device, and a full copy device that may be used in connection with an embodiment of the system described herein.

FIG. 6 is a schematic diagram 100 that illustrates a system including a logical device 102, a point-in-time image device 104, a journal device 106, and a full copy device 108 that may be used in connection with an embodiment of the system described herein. As noted elsewhere herein, the logical device 102 may be implemented using any appropriate storage logical device mechanism. Similarly, the point-in-time image device 104 may be any logical point-in-time image device that can provide snapshot functionality, and/or other appropriate point-in-time image functionality, for the logical device 102. The journal device 106 provides storage for sections of data (e.g., tracks) of the logical device 102 that are overwritten after the point-in-time image device 104 has been initiated. The journal device 106 may be provided on the same physical device as the logical device 102 or may be provided on a different physical device.

In an embodiment, the system described herein may also be used in connection with full copies of data generated and stored according operation of the full copy device 108. The full copy device 108 may be a logical storage device like the logical device 102. As discussed in more detail elsewhere herein, the full copy device 108 may be configured to contain data copied from the logical device 102 and corresponding to one or more point-in-time images. As described below, the point-in-time image device 104 may create a point-in-time image and then, subsequently, data from the logical device 102, and possibly the journal device 106, may be copied and/or refreshed to the full copy device 108 in a background process that does not interfere with access to the logical device 102. Once the copy is complete, then the point-in-time image is protected from physical corruption of the data of the logical device 102, as discussed in more detail elsewhere herein. Note that, as shown in the figure, it is possible to have multiple copy devices 108', 108" etc. so that all of the copy devices 108, 108', 108" protect the point-in-time image from physical corruption. Accordingly, for the discussion herein, it should be understood that references to the copy device 108 may include, where appropriate, references to multiple copy devices. Note that, for some embodiments, the copy devices 108, 108', 108" may be copies provided at different times. Similarly, the system described herein may be applicable to multiple point-in-time copies provided at the same time or different times, like that shown in FIG. 5.

It is noted that the system described herein may be used in connection with use of consistency groups and with features for maintaining proper ordering of writes between storage devices. A consistency group represents a grouping of storage volumes (virtual or not) which together offer an application consistent image of the data. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

In an embodiment of the system described herein, it is further noted that content protected by point-in-time images, such as snapshots, e.g. in connection with CS/CDP, may be extended to include not only user data but further include configuration metadata, and/or other appropriate configuration information, of the storage management system. Configuration metadata of the storage management system may be information used for configuration volumes, storage devices, consistency groups and/or other appropriate storage management system elements, as further discussed elsewhere herein. A user may want to rollback a storage management system to a past point due to performance or stability issues attributed to configuration changes. The system described herein enables rollback to prior states based on storage configuration metadata in addition to rollback of user data and provides for synchronization of the data and configuration metadata in connection with a rollback, as further discussed elsewhere herein. For further discussion of systems using point-in-time image technologies involving both user data and configuration metadata, reference is made to U.S. patent application Ser. No. 13/340,958 to Nickurak et al., filed Dec. 30, 2011, entitled, "Continuous Protection of Data and Storage Management Configuration," which is incorporated herein by reference.

Figure 7:
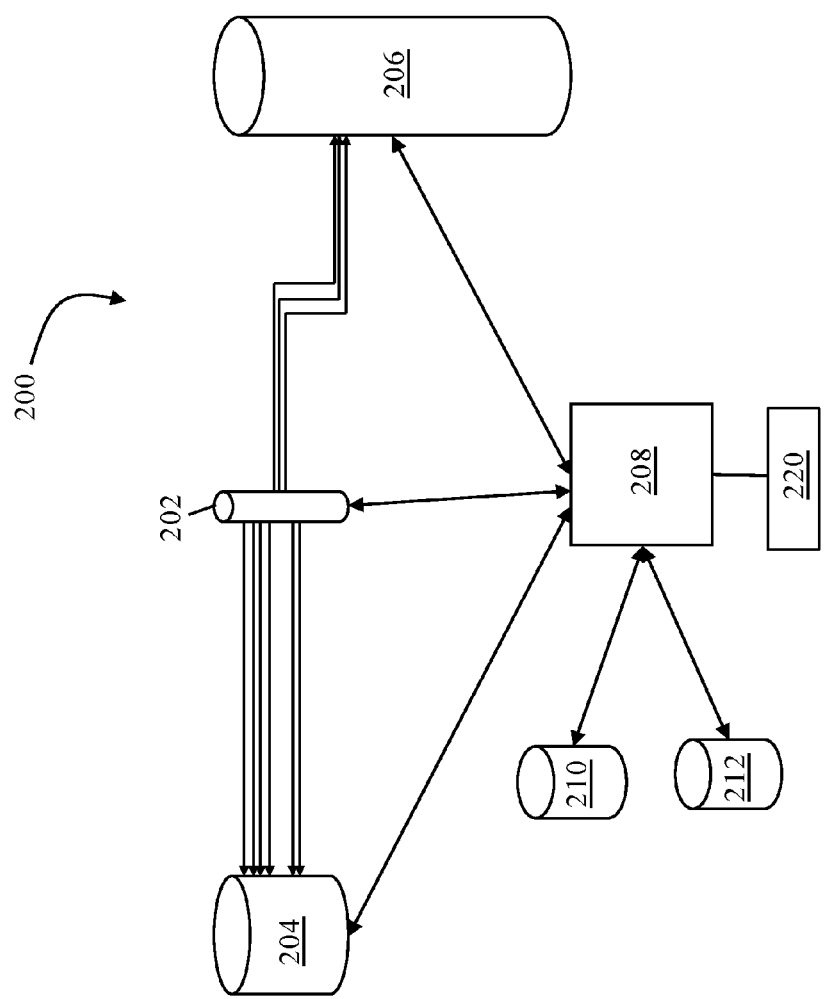
FIG. 7 is a schematic diagram that illustrates a continuous protection device that facilitates continuous or near continuous backup of data and storage configuration metadata using snapshots, other appropriate point-in-time images, according to an embodiment of the system described herein.

FIG. 7 is a schematic diagram 200 that illustrates a continuous protection device 202 that facilitates continuous or near continuous backup of data using snapshots, and/or other appropriate point-in-time images, and that may be used according to an embodiment of the system described herein. The continuous protection device 202 may contain pointers to a standard logical device 204 for a plurality of tracks such that, for any particular track, if the continuous protection device 202 points to a corresponding track of the standard logical device 204, then the corresponding track has not changed since creation of the continuous protection device 202. Note that any subsections, besides track, may be used to implement the system described herein. Accordingly, it should be understood in connection with the discussion that follows that although tracks are mentioned, other units of data having another size, including variable sizes, may be used. The continuous protection device 202 also contains pointers to a journal device 206 for a plurality of corresponding tracks. The journal device 206 contains data for tracks that have changed since creation of the continuous protection device 202.

The diagram 200 also shows an I/O module 208 that handles input and output processing to and from other modules, such as input and output requests made by the DA's 38a-38c and HA's 28a-28c. The I/O module 208 may be provided with information from a cycle counter 210 and/or a timer 212, among other possible information sources, that may be used to synchronize storage for a plurality of storage devices (i.e., a consistency group). The I/O module 208 may further include, and/or be coupled to, a user interface 220 that enables a user to tag data streams, among other functions as further discussed elsewhere herein. The user interface may be implemented using appropriate software and processors and may include a display and/or otherwise include operation using a display.

The system described herein allows for the ability to roll back/forward on multiple levels, including: per-volume basis, for configuration metadata and/or data; per-consistency group basis, for configuration metadata and/or data; per-system basis (all consistency groups, and system-wide configuration), for configuration metadata and/or data; and/or per-multi-system basis with the ability to control multiple systems with one user interface, for rolling management configuration and/or data. Other features and advantages of the system described herein include: elimination of manual storage configuration backups, which means reducing error-prone/inconvenient steps; elimination of manual storage configuration restores, which provides for reducing another set of error-prone/inconvenient steps; automatic write order fidelity across rollback in the presence of configuration changes; ability to control the roll back/forward points for management configuration/data independently. This allows choosing whether to roll management configuration back/forward only in those circumstances that warrant it; and/or ability to control the roll back/forward for configuration/data stream on a per volume and/or consistency-group and/or system-wide basis.

The system described herein allows for choosing the granularity of the roll back/forward of some of the system's volumes/consistency groups without requiring the whole system to roll back. Furthermore, the multi-system control aspect of the system described herein allows for restoring an organization's whole infrastructure (management configuration and data, independently) to a point in the past (or future) with the convenience of a single user interface.

According to the system described herein, techniques are provided for incremental Continuous Data Protection (iCDP) as a process to secure frequent, and space efficient, versions of consistent point-in-time images of a group of volumes using snapshot technology. In an embodiment, the group of volumes may be defined and organized as Version Data Group (VDGs). This system described herein may include tools and procedures to plan and operate a VDG and to use the member versions of the VDG to create and terminate target volume sets, particularly in connection with managing and/or optimizing use of log space on a journal or log device, as further discussed in detail elsewhere herein.

The system described herein provides for automation to create and manage frequent snapshots of defined groups of volumes. The incremental approach of the system described herein provides a convenient way to roll back to prior point-in-time versions to investigate data damage due to processing errors or other forms of corruption. The intervals between versions may be controlled. With sufficient resources the version increments may be controlled to be small, such as in minutes or smaller. The system beneficially provides for identifying, monitoring, and reclaiming use of log space in log devices in connection with managing recovery and roll back capabilities of the system to desired data versions for purposes of data protection. The system described herein may be implemented using any appropriate computing architecture and operating system, including, for example, using components of IBM Corporation's System z environment including use of z/OS and z/Architecture computing systems. For further discussion of the use of z/OS and z/Architecture components in simulated I/O environments, including techniques for the emulation of z/OS and z/Architecture components, reference is made to U.S. patent application Ser. No. 12/215,984 to LeCrone et al, filed Jun. 30, 2008, entitled "I/O Fault Injection Using Simulated Computing Environments," which is incorporated herein by reference.

The system described herein further provides for that by using target volume sets created from VDG version, repair strategies may be developed and tested without requiring the isolation of production systems or recreations to diagnose problems. Repairs may be possible on the source systems or the creation of a repaired replacement. Diagnostic target sets may not necessarily require full source image capacity. Techniques for iCDP implementation may include determining the storage capacity required for the associate snapshot log pool. Advantageously, the log capacity required according to the system described herein may be significantly less than the total duplication of source volumes capacity.

A point-in-time image (or snapshot) system architecture according to an embodiment of the system described herein may be storage efficient in that only first write track pre-write images are logged. The total number of unique tracks written while a snapshot version is active determines the log pool capacity consumed. If multiple versions are created the persistence of the track pre-write image in the pool is dependent on the number of previously activated versions that share that log entry. Reduction of log capacity consumption requires that a track pre-write image is no longer shared by versions. This is achieved by the termination of all snapshot versions sharing that image.

Multiple snapshot versions of a VDG set of volumes are created at regular intervals. Differential data tracking information, such as SDDF tracking information, may be used to analyze the write frequency and density of the source members of a VDG over a representative period of versioning intervals. Based on the analysis, the versioning intervals may be controlled to optimize the storage of the versions and the use of log capacity.

Pre-write images for tracks are created in the log pool or device when the first new write to a track occurs after a new snapshot version is activated. All subsequent writes to that track until the next interval are not logged since they are not needed to recreate a target image of the snapshot version. All prior versions containing the first write track share the same logged pre-write image. According to the system described herein, using the current source volumes and logged track pre-write images a selected version can be recreated on a target volume set.

SDDF provides a local function that marks modified (written) tracks and does not require any remote partner device. The differential update for local and remote devices uses the local and remote SDDF data to determine which tracks need to move to synchronize the pair. According to the system described herein, a first write analysis, as described elsewhere herein, may use local SDDF information that marks which tracks have been modified in a given interval. At the end of a current interval the SDDF information may be collected for future analysis and then cleared from the devices of interest. The SDDF mark, collect, and clear processes may repeat for each subsequent interval. The resulting collection of interval SDDF information provides maps of first writes that may be analyzed. VDG interval addition or reduction in log track space consumption may be determined. The collected SDDF maps may also contain information about persistence of shared first write tracks between VDG intervals.

For small interval SDDF first write maps collected, various VDG characteristics may be analyzed. For example, if the collected map intervals are 2 minutes VDG intervals of 2, 4, 6, 8 etc. . . . minutes may be analyzed for log space impact. The VDG interval duration and the number VDG intervals in a rotation set allows an analysis of rollback resolution (the time between snapshots) and log space consumption and management. The determination of log space versus how granular a CDP period and how far in the past is recovery possible may be assessed, as further discussed elsewhere herein.

FIGS. 8-11 are schematic illustrations showing representations of storage device(s) in connection with a data protection system using a log device according to an embodiment of the system described herein.

FIG. 8 shows a representation 300 according to an embodiment of the data protection system described herein with a 5 track storage device for which each track 1-5 may contain source volume data D1-D5, respectively. A journal or log device 302 is shown, like that discussed elsewhere herein, that may be used in connection with data protection for purposes of roll back or other recovery processing. As discussed elsewhere herein, the log device 302 is not necessarily a single device and may include log capacity storage of a log pool comprised of one or more devices.

FIG. 9 shows a representation 300' according to an embodiment of the data protection system described herein showing a point-in-time image or version (V1) of data D3 made. There has been no write yet performed to the source data and thus there are no log entries in the log device 302. It is noted that the point-in-time version V1 of data D3 is illustrated in connection with Track 3 where the source volume of data D3 is stored. However, it is noted that the version V1 (and/or any other of the point-in-time versions discussed herein) may be stored in any appropriate storage location, including any suitable one or more of the devices discussed herein, and is not necessarily stored on Track 3 or any other of the tracks shown in connection with the 5 track storage device.

FIG. 10 shows a representation 300" according to an embodiment of the data protection system described herein showing additional point-in-time versions being made according to the system described herein. There are no writes to the devices over the intervals in which versions V2 and V3 are made, thereby versions V2 and V3 may be the same as version V1, and there are no required log entries for any versions V1-V3 in the log device 302. The figure shows that there are no writes to the device until the time of version V4 for a write (W1) to Track 3 (causing data D3' on the source volume) which causes a pre-write log entry 302a in the log device 302 to be logged according to the system described herein. The log entry 302a at the time of version V4 is a log entry corresponding to data D3.

FIG. 11 shows a representation 300''' according to an embodiment of the data protection system described herein showing point-in-time version creation continuing until the time of version V8 when another write (W2) to Track 3 (resulting in data D3" stored on the source volume) creates a pre-write log entry 302b in the log device 302 corresponding to the write W1 (for data D3'). The log entry 302b at the time of version V8 is a log entry corresponding to the write W1. Versions V1, V2, and V3 may share the log entry 302a holding D3. Versions V4, V5, V6, and V7 may share the log entry 302b holding W1. V8 (reflecting write W2) does not need log capacity until a subsequent write occurs.

The system described herein may be used to recover log space based on desired criteria. For example, the criteria may be to recover 50% of the log space, and a query may be as to which point-in-time version could be terminated to accomplish this such that log space for corresponding log entries may be reclaimed/recovered. Control and management of queries, criteria and/or result output may be performed using control modules and user interfaces like that discussed elsewhere herein (see, e.g., FIG. 7). Log persistence is where some number of versions share the same pre-write image. This could be representative of data that is periodic and only updated infrequently. In this case, the number of point-in-time versions necessary to terminate could be large in order to reclaim log space. Log entries for more active same track writes may be shared by a smaller number of versions, thereby requiring fewer version terminations to reclaim log space and recover desired log capacity.

FIGS. 12-14 show scenario representations according to an embodiment of the system described herein for reclamation processing of a subject device to reclaim 50% of log capacity according to the scenario, discussed above, where Track 3 (storing data D3) is the subject of data writes. The example of reclaiming 50% log capacity as a criteria is discussed; however, it is noted the system described herein may be appropriately used in connection with reclaiming any desired amount or percentage of log capacity.

FIG. 12 is a schematic representation 301 showing that terminating point-in-time versions V1, V2, and V3 would allow the log entry 302a corresponding to data D3 to be reclaimed in the log device 302 (shown by dashed lines around log entry 302a). In this case, versions V4 through V8 persist with the W1 log pre-write image required to reconstitute V4 through V7. V8 has no pre-write image required yet.

FIG. 13 is a schematic representation 301' showing that, alternatively and/or additionally, terminating versions V4, V5, V6, and V7 allow the log entry 302b holding W1 to be reclaimed in the log device 302 (shown by dashed lines around log entry 302b). In this case, versions V1, V2, V3, and V8 persist with the log entry 302a for the D3 pre-write image required to reconstitute V1 through V3. V8 has no subsequent pre-write image required yet.

FIG. 14 is a schematic representation 301" showing that, alternatively and/or additionally, terminating V5 through V8 allows the log entry 302b holding W1 to be reclaimed in the log device 302 (shown by dashed lines around log entry 302b). In this case, versions V1, V2, V3 share the log entry 302a for the D3 pre-write image to reconstitute V1 through V3. V4 has no subsequent pre-write image required.

FIGS. 15 and 16 show scenario representations according to an embodiment of the system described herein for reclamation of a subject device when multiple tracks are involved to reclaim 50% of the log capacity.

FIG. 15 is a schematic representation 400 according to an embodiment of the system described herein showing an ending state of a scenario in which a write W1 was made to D3 (now data D3' on source volume) on Track 3 at a time of the version V4 and a write W2 was made to data D2 (now data D2' on source volume) on Track 2 at a time of version V8. Accordingly, in log device 402, log entry 402a corresponds to the D3 pre-write image created at the time of version V4 and log entry 402b corresponds to the D2 pre-write image created at the time of version V8.

FIG. 16 is a schematic representation 400' according to an embodiment of the system described herein showing reclaiming of 50% log capacity based on the scenario of FIG. 15. In this case, the D3 pre-write image is required by versions V1 through V3, and the D2 pre-write image is required by versions V1 through V7. Accordingly, only terminating V1 through V3 reclaims 50% of the log capacity, namely, the D3 pre-write image log space of entry 402a in the log device 402 (shown by dashed lines around the entry 402a). The D2 pre-write image of log entry 402b is the most persistent being shared by all versions except V8. The example of reclaiming 50% log capacity as a criteria has been discussed; however, it is noted the system described herein may be appropriately used in connection with reclaiming any desired amount or percentage of log capacity.

According to the system described herein, using data collected for the first writes to tracks in a volume group during a planning interval allows estimating the potential maximum capacity for the log pool that is needed for various frequency of version creation.

The system described herein provides that information on pre-write image log persistence or the number of consecutive versions sharing a log entry may also be analyzed. This provides information concerning how removing versions from the VDG effects log pool capacity reclamation. This information may be used for understanding the number of versions that may be removed to achieve a target log pool capacity. Accordingly, oldest versions and versions other than the oldest in a rotation set may be considered for removal.

Additionally, rotation of a set number of versions (the VDG) may be analyzed. First writes in an interval give the net add to log pool capacity consumption. In this case, termination of the oldest version member in the rotation set may give the potential maximum reduction in log consumption. The actual reduction is dependent on the number of versions sharing a particular track pre-write image. When a target log pool size is desired the number of versions to terminate can be analyzed.

In a VDG rotation cycle the oldest member version would be removed prior to adding a new version. The log capacity may need to be the maximum expected concurrent log pre-write image capacity plus a margin for safety. It is noted that demand reclaim from oldest to newest may require the least active analysis. For example, using differential data write monitoring, such as SDDF write monitoring, for each version allows for a log capacity by version metric. However, reclaiming pre-write image log capacity may involve termination of some number of versions to achieve a desired log capacity reduction. As seen, for example, in the scenarios discussed herein, three versions (V1, V2, and V3) may need to be terminated before the single pre-write image log capacity associated with the data D3 can be reclaimed. A worst case would be where many versions with low or no writes are created and during the most recent version having most or all tracks written. An example might be where a DB2 table create and format occurs in generation 100 and the prior 99 versions share the pre-write images of the involved tracks. The 99 prior versions would need to be terminated before the pre-write image log capacity could be reclaimed.

Exempting particular versions from rotation termination makes this problem even more evident. While capacity consuming (equal to the source capacity of the VDG) creating a full copy target and unlinking it after being fully populated would be an operational tradeoff to diminishing impact on log reclamation by holding one or more versions exempt from termination.

In another embodiment, the system described herein may be used in connection with a continuous review of which versions contribute the least to log capacity but share the most images with other versions. Referring, for example, back to FIG. 15, in this case it is noted that versions V1, V2, V5, V6 and V7 could all be terminated without losing any unique version of the source volume data. V3, V4, and V8 are unique versions for this source volume.

FIG. 17 is a schematic representation 500 according to the embodiment of the system described herein shown in FIG. 15 in which versions V1, V2, V5, V6 and V7 have been terminated, but all unique first write pre-write images in each version interval are preserved. Tracks with data D1, D2, D3, D4, D5, W1, and W2 and the versions that consistently relate them in time are available to create useable target sets based on use of the log entries 502a, 502b of the log device 502. This can be determined by tracking the first write differential (SDDF) data for each version interval.

According further to the system described herein, it is noted that with a VDG creating short interval snapshot members it is possible that some VDG members will have no first write activity and can be terminated after the next interval VDG is activated. If there is first write activity within the VDG there may be subgroupings in that VDG interval that do not have any first writes for the interval. If a subgroup is identified by the user as logically-related volumes (a particular application, for example) only the snapshots of the volumes in that subgroup may be terminated if there are no first write to that subgroup. This could also apply to single volumes within the VDG that do not have interdependent data with other volumes in the VDG. These determinations may be specified by the user of the VDG control mechanism.

Accordingly, FIGS. 18 and 19 show scenario representations according to an embodiment of the system described herein for reclamation of a subject device when multiple volumes are involved to reclaim log capacity. Specifically, in an embodiment, the system described herein may also be used in connection with application to volumes instead of tracks and may provide for continuously collapsing volume log images.

FIG. 18 is a schematic representation 600 according to an embodiment of the system described herein showing an ending state of a scenario for storage of 5 volumes (Volumes 1-5) and for which 8 point-in-time versions (V1-V8) thereof have been made. The representation 600 shows a state in which a write W1 was made to D3 (now data D3') of Volume 3 at a time of the version V4 and a write W2 was made to data D2 (now data D2') of Volume 2 at a time of version V8. Accordingly, in log device 602, log entry 602a corresponds to the D3 pre-write image created at the time of version V4 and log entry 602b corresponds to the D2 pre-write image created at the time of version V8.

FIG. 19 is a schematic representation 600' according to the embodiment of the system described herein shown in FIG. 18 in which versions V1, V2, V5, V6 and V7 have been terminated, but all unique first write pre-write images of the volumes in each version interval are preserved. The capability for reconstruction of a VDG point-in-time when constituent member volumes may have their snapshot terminated is illustrated in the figure. Point in time V1, V2 and V3 can independently be reconstructed using the original data images D1 through D5 of the Volumes 1-5 and the log entries 602a, 602b of the log device 602. V5, V6, and V7 only need the W1 first write from V4. Reconstruction of version V8 needs the Volume 3 version V4 for W1 and itself for the Volume 2 W2 first write pre-write image. This figure depicts the minimum (3 versions) needed to reconstruct 8 distinct points in time for the illustrated volumes. A first write to any single track on a volume requires the volume snapshot to be preserved.

Figure 20:
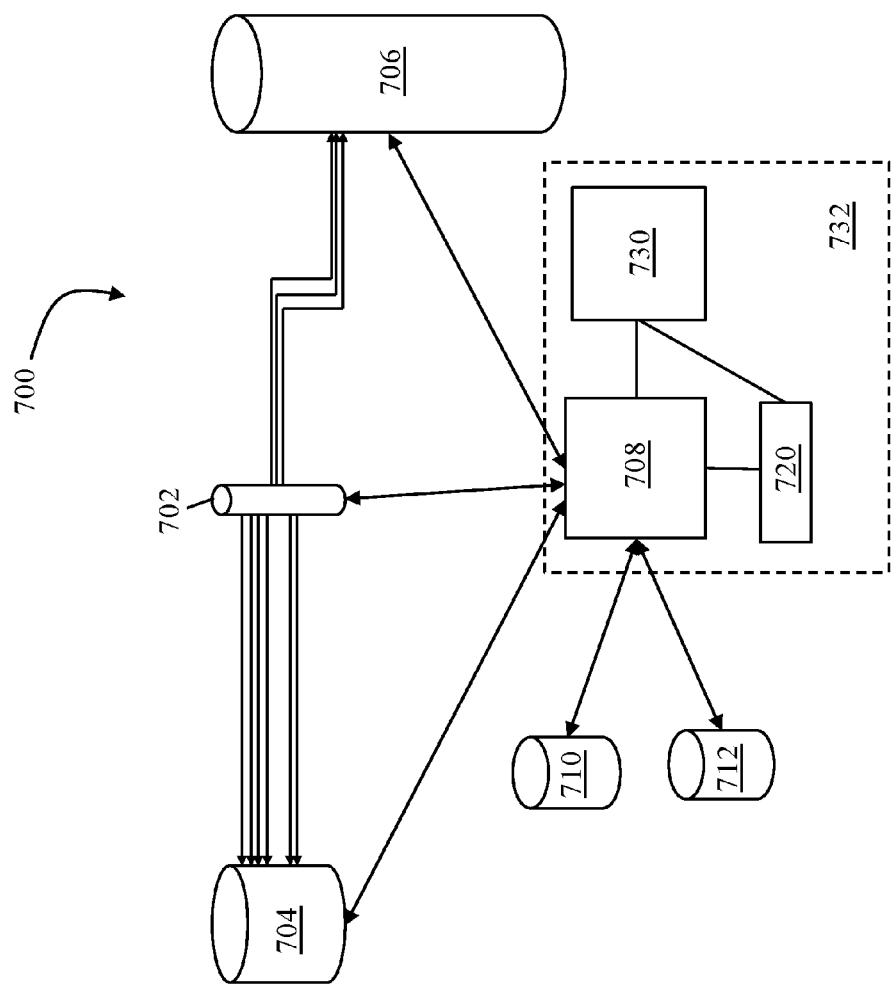
FIG. 20 is a schematic diagram showing a system implementing iCDP according to an embodiment of the system described herein.

FIG. 20 is a schematic diagram showing a system 700 implementing iCDP according to an embodiment of the system described herein. A point-in-time image device 702 may facilitate continuous or near continuous backup of data using snapshots, and/or other appropriate point-in-time images, as further discussed in detail elsewhere herein. The point-in-time image device 702 may contain pointers to a standard logical device 704 for a plurality of tracks storing data. The point-in-time image device 702 may also contains pointers to a log device 706 logging data changes to corresponding tracks, as further discussed in connection with the scenarios discussed elsewhere herein.

The system 700 may also include a I/O module 708 that handles input and output processing in connection with receiving and responding to requests and criteria concerning the providing of efficient data protection operations in accordance with the system described herein. The I/O module 708 may be provided with information from a cycle counter 710 and/or a timer 712, among other possible information sources, that may be used in connection with storage of data among a plurality of storage devices (i.e., for a consistency group and/or VDG). The I/O module 708 may further include, and/or be coupled to, an interface 720 that enables interaction with users and/or hosts in connection with operation of the system described herein.

A point-in-time data analytic analyzer 730 is shown that may be used to automatically/programmatically determine which point-in-image to roll back for one or more data recovery operations according to an embodiment of the system described herein. For example, information, such as host meta structures, may be available to the analyzer 730 to facilitate the scanning and/or identification of logical data corruption or errors. Such host meta structures may include structures of IBM's System z environment, as discussed elsewhere herein, such as logical structures of a volume table of contents (VTOC), VTOC index (VTOCIX), virtual storage access method (VSAM) volume data sets (VVDS), catalogs and/or related structures that are logical in nature and which may be used in connection with the scanning for logical failures rather than physical failures, and may indicate what a user or customer may be looking for in a roll back or recovery scenario. For example, in an IBM mainframe storage architecture, a VTOC provides a data structure that enables the locating of the data sets that reside on a particular disk volume, and the z/OS may use a catalog and the VTOC on each storage system to manage the storage and placement of data sets. In an embodiment, the system described herein may then use these structures to efficiently provide desired roll-back and data protection operations according to the features discussed herein.

It is noted that the I/O module 708, interface 720 and/or analyzer 730 may be separate components functioning like that as discussed elsewhere herein and/or may be part of one control unit 732, which embodiment is shown schematically by dashed lines. Accordingly, the components of the control unit 732 may be used separately and/or collectively for operation of the iCDP system described herein in connection with the creation, maintenance, identification and termination of point-in-time image versions to respond to requests and criteria, like that discussed elsewhere herein, including criteria concerning identification of necessary point-in-time versions to fulfil desired roll back scenarios and criteria involving the efficient use of log capacity to maintain the desired data protection capability.

For operation and management functions, the system described herein may provide for components like that discussed herein that may be used to create a VDG volume group and support sets of selection options, such as Group Name Services (GNS) in connection with data protection operations. The system described herein may further be used to define version interval frequencies and to define the maximum number of member versions in a VDG. Options for when the maximum is reached may include rotation when the oldest version is terminated before the next version is created, stopping with notification, and terminating n number of oldest versions before proceeding, etc. The system may further define target volume set(s) and validate that the type, geometry, and number match the related VDG.

The system described herein provides for automation to manage one or more VDGs. Point-in-time versions may be created based on defined interval criteria on a continuing cycle. VDG version rotation may be provided to remove the versions prior to next VDG version creation. The number of VDG version terminations necessary to achieve a log pool capacity target may be tracked. Host accessible images of selected VDG versions may be created and metadata of the target set may be managed to allow successful host access. Metadata management may include: validation of type and number of target volumes; online/offline volume verification; structure checking of a target volume set; optional volume conditioning; catalog management and dataset renaming; and providing alternate logical partition (LPAR) access.

A target volume set may be created from a selected VDG version and a user may be provided with selected copy and access options. A selected target volume set may be removed and which may include validating a target volume set system status, providing secure data erase of target volume set volumes and/or returning target volume sets to available pools. Specific versions may also be removed and the system supports explicit version termination, as discussed in detail elsewhere herein.

The system described herein may provide for monitoring and reporting functions using components like that discussed elsewhere herein. The status of created versions in a VDG may be monitored. Log pool capacity may be monitored and the system may provide for alerts and actions for log pool capacity targets, log capacity reclaim reports may be generated when versions are removed (i.e. during cycle rotation), and active target volume sets needed to be removed to allow the removal of a version may be identified. The status of an active target volume set, and related VDG versions may be monitored. The status of target volumes sets created outside (unmanaged) of the VDG environment may be monitored. Versions needed to be removed to reclaim some target amount of log pool capacity may be identified, as discussed in detail elsewhere herein.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein may, alone or in combination with other devices, provide an appropriate platform that executes any of the steps described herein. The system may operate with any snapshot mechanism not inconsistent therewith and further with any appropriate point-in-time image mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

As described above, snapshots may be taken of a set of logical source devices on a continuous basis. In at least one embodiment, snapshots may be taken of all logical source devices in the set at each occurrence of a defined time interval, such as every 10 minutes or other suitable time period. In some cases, the set of logical source devices may be a large number such as on a scale of thousands of logical devices thereby resulting in thousands of snapshots taken at each defined time interval. Additionally, as described above, the large number of snapshots taken at each time interval may be synchronized or consistent such as with respect to a particular point in time. In at least one embodiment, a maximum number of snapshots for each logical source device may be allowed.

As mentioned elsewhere herein, a problem may occur where there is a logical data failure, data corruption or data error in connection with data of one or more logical devices of the set for which snapshots are obtained in a synchronous manner on a continuous basis. If there is a logical data corruption of one or more logical devices of the set, processing may be performed to facilitate analysis and/or correction of the data corruption. Such processing may examine and analyze the snapshots of the set of logical source devices in order to determine when the data corruption occurred, the source of the corruption, and the like. In connection with such processing, it may be necessary to examine snapshots taken over a time period (for many defined time intervals) for the entire set of logical source devices. Each snapshot of a logical source device of the set may need to be linked to a host address in order to examine that snapshot and determine if it includes the logical data corruption. With a large number of source devices in the set and also the large number of snapshots at different points in time, the customer will quickly consume available host device addresses due to the large number needed to examine each consistent snapshot set of devices at each time interval. Additionally, a large amount of work may be required to both expose each snapshot set using appropriate snapshot facility command and additionally then examine the large number of snapshot sets for a large number of logical source devices. Thus, the foregoing may generally consume an unacceptable amount of system and human resources.

In at least one embodiment, techniques herein may be used to access a snapshot through its source logical device. In such an embodiment, I/Os directed to the logical source device may be redirected to a particular snapshot of the logical source device. As described herein, the snapshot may be a point in time copy of the source device where the snapshot may be associated with a point in time prior to the current point in time. Thus, through the source device, a snapshot of a prior point in time version of the source device (e.g., snapshot of the source device) may be accessed.

Thus, an embodiment in accordance with techniques herein may initially link/connect to the set of primary or source devices for which each snapshot consistency set is taken and then issue I/Os to the set of source devices to access a particular snapshot of each of the source devices of the set. An application, or more generally executable code, may be written which then programmatically issues such I/O commands and examines the different sets of consistent snapshots at different points in time to facilitate analysis of the logical data corruption (e.g., when the data corruption occurred (e.g., which snapshot or point in time copy), on which one or more source devices, and the like). As described in more detail below, processing may be performed in an embodiment in accordance with techniques herein that selects a particular snapshot, or more generally, a particular point in time version, of a source device to be used in connection with I/Os directed to the source device. Such selection may be performed in accordance with one or more criteria used to determine whether to generally direct an I/O to the source device or a prior point in time version of the source device. Additionally, the one or more criteria may be used to further facilitate selection of a particular one of the point in time versions of the source device, and then direct the I/O to the selected particular point in time version of the source device. In at least one embodiment, the one or more criteria indicates to use a particular one of the plurality of point in time versions of the source device under one or more conditions including any one or more of: if the I/O operation is issued by a particular application, if the I/O operation is issued by code executing on a particular operating system image on the host, if the I/O operation is issued by a particular host, if the I/O operation is received by a particular controller or HA (e.g., host interface unit) of the data storage system, if the I/O operation is issued over a logical path included in a defined logical path group, if the I/O operation is directed to a particular source device, if the I/O operation is directed to a particular file, if the I/O operation is directed to a particular data set, if the I/O operations is directed to a particular extent of a file, if the I/O operation is a read operation, if the I/O operation is a write operation, and if the I/O operation is directed to a particular logical device and the I/O is also sent by a particular host or host operating system image over a logical path to a particular host interface unit of the data storage system. In some embodiments, use of such criteria and redirecting I/Os to a previous point in time version of a source device may be performed transparently with respect to the application issuing the I/Os. The foregoing criteria and other aspects of techniques herein are described in more detail below.

Figure 21:
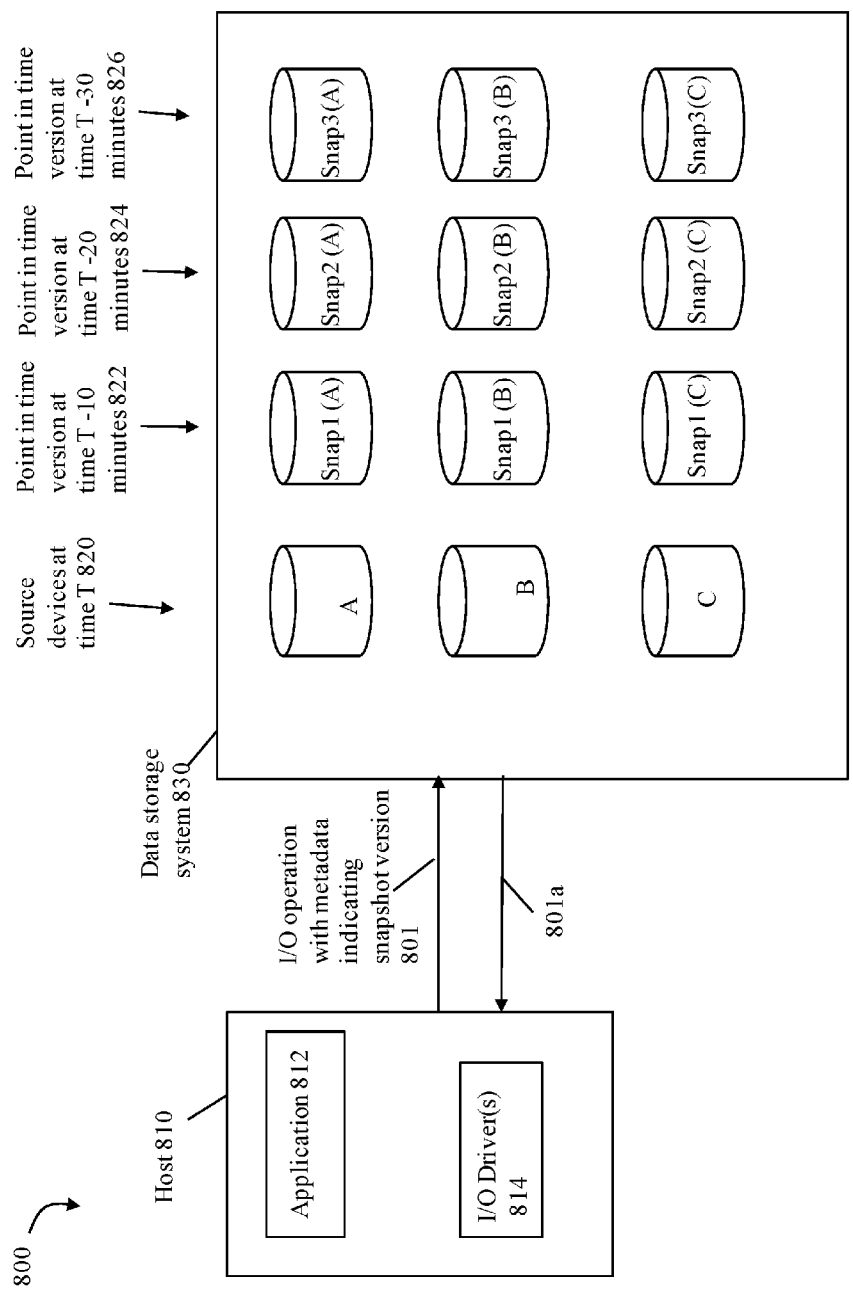
FIG. 21 is an example of systems and components that may be used in an embodiment in accordance with techniques herein.

Referring to FIG. 21, shown is an example illustrating components and systems that may be used in an embodiment in accordance with techniques herein. The example 800 includes host 810 and data storage system 830. The application 812 may be executing on the host 810. Additionally, the host may include one or more I/O drivers 814 in different layers of the runtime I/O stack associated with the data path. In at least one embodiment, the host 810 may be implemented using any appropriate computing architecture and operating system, including, for example, using components of IBM Corporation's System z environment including use of z/OS and z/Architecture computing systems. Additionally, the data storage system 830 may be a data storage array, such as EMC's Symmetrix® VMAX® data storage system, as well one or more other data storage systems as may vary with the embodiment. Communications between the host 810 and data storage system 830 may use IBM's FICON (Fiber Connection), which is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

The data storage system 830 includes source devices and consistent sets of snapshots of the source devices taken on a continuous basis in a synchronized manner as described elsewhere herein. In particular element 820 denotes a column of source devices which may be logical devices as described herein which are current versions of the source devices A, B and C. Element 822 denotes a first consistent set of point in time copies of the source devices A, B and C taken at a first time point in time. Element 824 denotes a second consistent set of point in time copies of the source devices A, B and C taken at a second time point in time. Element 826 denotes a third consistent set of point in time copies of the source devices A, B and C taken at a third time point in time. Each of 822, 824 and 826 may be a consistent set of point in time copies of the source devices such as a set of consistent snapshots of the source devices A, B and C obtained in a synchronized manner. For example, element 822 denotes a current point in time version of the source devices at current time T−10 minutes, element 824 denotes a current point in time version of the source devices at time T−20 minutes and element 826 denotes a current point in time version of the source devices at time T−30 minutes. It should be noted that only 3 source devices and 3 sets of consistent snapshots or point in time copies are illustrated in FIG. 21 for simplicity of illustration. More generally, the number of source devices may be on the scale of thousands and the number of snapshot sets may be hundreds subject to any maximum limits or thresholds that may be used in an embodiment.

It should be noted that for simplicity of illustration, only a single host 810 and only a single application 812 are included in the example 800. However, more generally, the host 810 may have multiple applications executing thereon where each such application may access a different point in time version of the source devices. Furthermore, there may be multiple hosts rather than a single host 810 where each such host may include one or more applications accessing the source devices, or various point in time versions of the source devices.

The application 812 may issue an I/O operation directed to one of the source devices, such as device A. The I/O operations may be processed on the host by a runtime stack of I/O drivers and other software that may vary with embodiment. In particular, one of the I/O drivers 814 included in the stack of I/O drivers in an embodiment in accordance with techniques herein may perform processing to determine, in accordance with one or more criteria, whether to perform the I/O operation with respect to accessing the source device A or a snapshot of source device A (e.g., a point in time version of device A prior to the current version). Additionally, the I/O driver may perform processing, in accordance with the one or more criteria, to select a particular snapshot version or point in time version of device A to access in connection with servicing the I/O operation. In at least one embodiment, application 812 may access data by performing an I/O operation through an access method whereby the access method may then call an I/O driver to perform the I/O operation. In connection with techniques herein, the foregoing processing typically performed where the I/O driver is invoked to perform the I/O operation may be further modified. The I/O driver itself may be modified to perform processing described herein. As a variation, an additional intercept I/O driver may be invoked which intercepts the I/O operation prior to being further processed by the original I/O driver. The additional intercept I/O driver may perform processing as described herein to add metadata to access various snapshots based on one or more criteria, as also described herein. In such an embodiment using the intercept I/O driver, the original I/O driver invoked through the access method is unaware of any augmentation to the processing performed by the additional intercept I/O driver to add the metadata to the I/O command (e.g., insertion of the snapshot version metadata into the I/O command based on one or more criteria is transparent to the original I/O driver invoked through the access method). Thus, the I/O driver described in following paragraphs as performing processing in an embodiment in accordance with techniques herein may be the additional intercept I/O driver.

If it is determined to direct the I/O operation to a snapshot of device A, the I/O driver may insert metadata, such as an indicator, into the command request to perform the I/O operation. The indicator may identify the particular snapshot version or point in time version of the source device A to which the I/O operation is directed. The command request may be sent 801 from the host 810 to the data storage system 830. On the data storage system 830, processing may be performed to access the data of the snapshot version of device A as denoted by the metadata inserted into the command request to perform the I/O operation. As with any I/O operation, once completed, a response may be returned 801a to the host 810.

As noted above, the I/O driver of 814 on the host 810 may use one or more criteria to determine whether to direct the I/O operation to the current version of the source device or a snapshot version of the source device. Additionally, if it is determined to direct the I/O operation to a snapshot of the source device, such one or more criteria may be used in selecting the particular snapshot version to which I/O 810 is directed. Furthermore, I/O driver inserts metadata into the command request for the I/O operation sent to the data storage system where the metadata may be an indicator identifying the particular snapshot version of device A to access in connection with servicing the I/O operation. The one or more criteria may identify one or more conditions of when to use a particular snapshot version of a device. For example, the one or more criteria used on the host by the I/O driver may identify one or more applications and, for each such application, a particular snapshot version or point in time version to use in connection with servicing I/O issued by the application. When the I/O driver receives an I/O operation from one of the applications identified in the criteria, the I/O driver may insert metadata into the I/O operation redirecting the I/O operation on the data storage system to be performed with respect to the particular snapshot version for the one application.

The one or more criteria used by the I/O driver may also identify one or more logical devices and, for each such logical device, a particular snapshot version or point in time version to use in connection with servicing I/Os directed to the logical device. When the I/O driver receives an I/O operation directed to one of the logical devices identified in the criteria, the I/O driver may insert metadata into the I/O operation redirecting the I/O operation on the data storage system to be performed with respect to the particular snapshot version for the one logical device.

The one or more criteria used by the I/O driver may also identify one or more files or data sets and, for each such file or data set, a particular snapshot version or point in time version to use in connection with servicing I/Os directed to the file or data set. When the I/O driver receives an I/O operation directed to one of the files or data sets identified in the criteria, the I/O driver may insert metadata into the I/O operation redirecting the I/O operation on the data storage system to be performed with respect to the particular snapshot version for the file or data sets.

The one or more criteria used by the I/O driver may also identify one or more file extents or portion of a file and, for each such extent or portion of a file, a particular snapshot version or point in time version to use in connection with servicing I/Os directed to the extent or file portion. When the I/O driver receives an I/O operation directed to one of the extents or file portions identified in the criteria, the I/O driver may insert metadata into the I/O operation redirecting the I/O operation on the data storage system to be performed with respect to the particular snapshot version for the extent or file portion.

The one or more criteria used by the I/O driver may also identify a particular type of I/O command, such as reads or writes, and for each such type of I/O command, a particular snapshot version or point in time version to use in connection with servicing the types of I/Os. When the I/O driver receives an I/O operation, such as a read, identified in the criteria, the I/O driver may insert metadata into the I/O operation redirecting the particular type of I/O operation on the data storage system to be performed with respect to the particular snapshot version for the I/O operation type. For example, an embodiment may redirect all reads to use one particular snapshot version and all writes to use a second different snapshot version.

In connection with insertion of such metadata as performed by the I/O driver, the application issuing the I/O operation to a logical device may be unaware of the I/O redirection to a particular snapshot or point in time version of the logical device (e.g., inserting the metadata is transparent to the application issuing the I/O operation). It should be noted that an embodiment may specify the one or more criteria in any suitable form. For example, the one or more criteria may be expressed in the form of rules with conditions that, when evaluated as true, result in the I/O driver inserting metadata indicating a particular snapshot or point in time version associated with the particular condition or rule. An embodiment in accordance with techniques herein may insert metadata identifying a particular snapshot version to be used for an I/O operation where the rule or condition may consider each criteria discussed above individually or in any suitable combination. For example, a rule may indicate to use a particular snapshot version of a logical device for I/Os which are issued by a particular application and also where such I/Os are directed to a particular file, logical device or data set.

An embodiment may provide a configurable setting on the host to enable and disable use of the one or more criteria in redirecting I/Os to different snapshot versions.

As a variation to the foregoing, metadata identifying a particular snapshot version to use for an I/O operation may be selectively embedded or included in the I/O operation prior to reaching the I/O driver in the I/O stack. For example, in at least one embodiment, the application 812 itself may selectively include an indicator into the I/O operation issued where the indicator identifies a snapshot version of a logical device to access when servicing the I/O operation. In this variation, the I/O driver may not insert any further metadata.

In addition to performing processing on the host side to redirect an I/O operation to use a particular snapshot through inserted metadata, the data storage system 830 may also use one or more criteria to determine whether to direct the I/O operation received on the data storage system to the source device or a snapshot version of the source device. Additionally, if it is determined to direct the I/O operation to a snapshot of the source device, such one or more criteria may be used in selecting the particular snapshot version to which I/O 810 is directed. On the data storage system, the one or more criteria may identify a particular set of logical paths over which source device(s) may be accessed. Each defined set of logical paths may have an associated identifier and, for each such set of logical paths, a particular snapshot version or point in time version to use in connection with servicing I/Os received over any logical path of the set. On the data storage system, the one or more criteria may identify a particular logical device where a particular snapshot version or point in time version may be used in connection with I/Os directed to the logical device where such I/Os are received at the data storage system. On the data storage system, the one or more criteria may identify a particular data storage system controller, such as an HA or host interface that receives I/O commands, where a particular snapshot version or point in time version may be used in connection with I/Os received by the particular HA at the data storage system. On the data storage system, the one or more criteria may identify an operating system image and, for each such operating system image, a particular snapshot version or point in time version to use in connection with servicing I/Os received on the data storage system from the particular operating system image (e.g., such as an application executing on an instance of the operating system image on a host). As described above in connection with processing performed on the host, the data storage system may use rules or conditions where the rule or condition may consider each criteria discussed above individually or in any suitable combination. For example, a rule may indicate to use a particular snapshot version of a logical device for I/Os which are issued by a particular operating system image or host, and also where such I/Os are sent to the data storage system over a particular logical path that is included in a defined set of logical paths. In at least one embodiment, a path group identifier may be used to uniquely identify a set of one or more logical paths from a particular host or host operating system image. The path group identifier may be associated with a particular control unit (e.g., such as a particular HA of the data storage system) for a particular logical device (e.g., such as logical device A) to define a set of logical paths when issuing I/O commands, for example, that are directed to logical device A, are sent from the particular host or host operating system image, and are received by the particular HA. In connection with techniques herein, a rule may be defined which indicates to use a particular point in time version of a source device in connection with such I/Os that are directed to logical device A and received at a particular HA over a logical path denoted by the path group identifier. In such an embodiment, the same path group identifier may be specified in connection with different control units or HAs and also different logical devices to define different sets of logical paths used in connection with techniques herein. To further illustrate, path group ID1 may denote a set of logical paths from a particular host or host operating system image. Path group ID1 may be used to define a first set of logical paths from the host or operating system image with respect to I/Os directed to logical device A received by HA1 of the data storage system. A first rule on the data storage system may indicate to use point in time or snapshot version V1 of a source device for I/Os received over the first set of logical paths just described. The same path group ID1 may be used to define a second set of logical paths from the host or operating system image with respect to I/Os directed to logical device B received by HA2 of the data storage system. A second rule on the data storage system may indicate to use point in time or snapshot version V1 of a source device for I/Os received over the second set of logical paths just described. The foregoing first rule or a second rule may be used in connection with booting a host operating system image on one of the hosts where all I/Os issued by the particular host to the data storage system are serviced using a particular snapshot or point in time version of one or more source devices.

An embodiment may provide a configurable setting on the data storage system to enable and disable use of the one or more criteria in redirecting I/Os to different snapshot versions.

An embodiment in accordance with techniques herein may have a configurable override option for resolving any conflicts of which snapshot version to use in the event that multiple rules are applicable and where multiple snapshot versions are indicated to be used. For example, an embodiment may have both the host and data storage system enabled to use rules and associated criteria as described above. It may be that a rule on the host evaluates to true causing metadata to be inserted into the I/O received on the data storage system. The inserted metadata may indicate to use a first snapshot version. In connection with processing the received I/O, a rule on the data storage system may also evaluate to true and indicate to use a second different snapshot version. In this case, an embodiment in accordance with techniques herein may have a configurable override option indicating which particular snapshot version to use. The override option may have an initial default setting or value which may be further modified or configured such as by a data storage administrator or manager.

Figure 22:
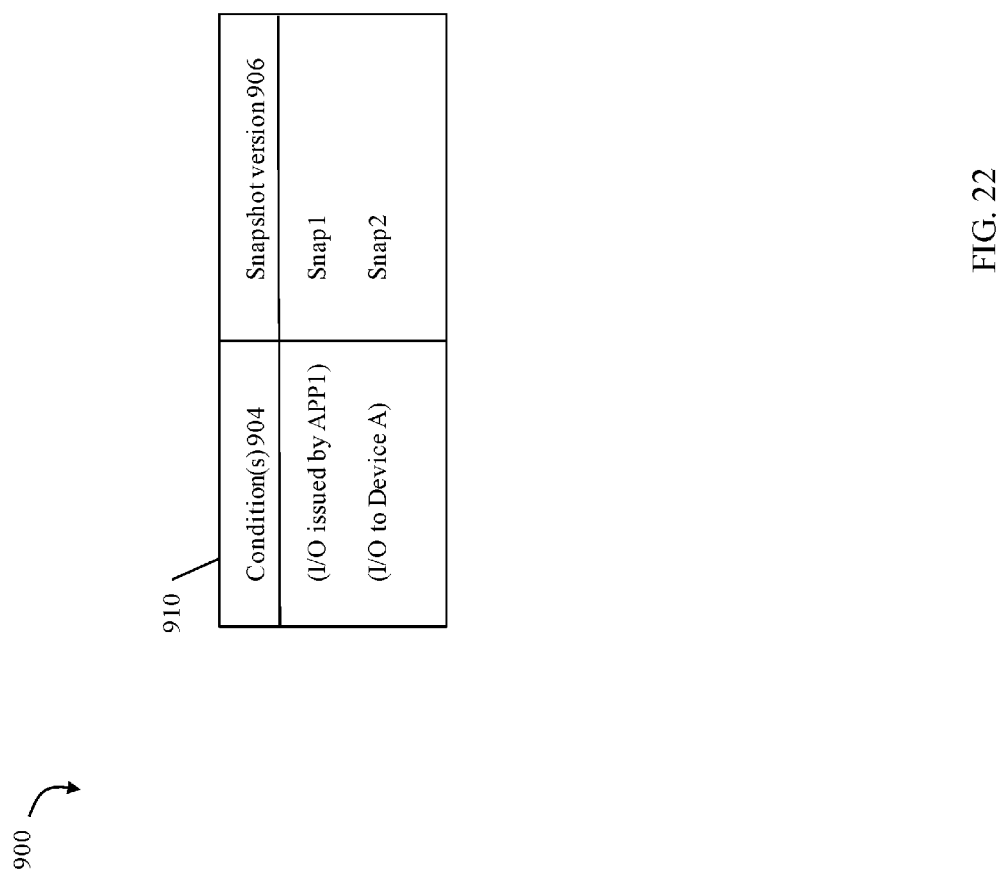
FIG. 22 is an example of a table of rules embodying conditions with one or more criteria in an embodiment in accordance with techniques herein.

Referring to FIG. 22, shown is an example 900 illustrating a table of rules that may be used in an embodiment in accordance with techniques herein. The table 910 may include a row in the table denoting each rule. Each rule may include one or more conditions 904 and an associated snapshot version 906 of a logical device to be used if the condition(s) 904 evaluate to true. For example, the first row of table 910 indicates to use snapshot version snap1 if an I/O is issued by application APP1. The second row of table 910 indicates to use snapshot version snap2 if an I/O is directed to source device A. Thus, table 910 is an example of rules that may be used host side such as by the I/O driver as discussed above that inserts metadata into an I/O operation where the metadata may include an indicator identifying the snapshot version to access when servicing the I/O operation on the data storage system. The one or more criteria used in selecting the particular snapshot version may be embodied in the conditions of the rules of the table 910. An embodiment of the data storage system 830 may also include a table of rules similar to table 910 in connection with one or more criteria used on the data storage system.

Figure 23:
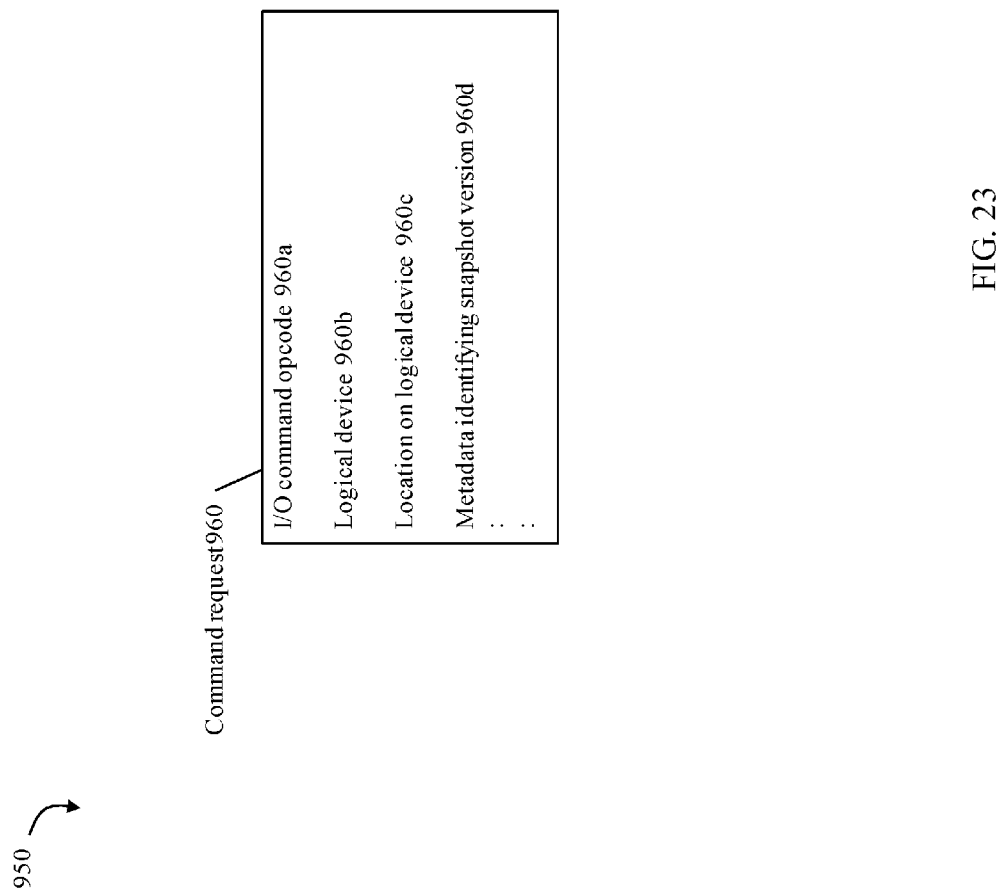
FIG. 23 is an example of a command request that may be used in an embodiment in accordance with techniques herein.

Referring to FIG. 23, shown is an example 950 illustrating information that maybe included in a command request in an embodiment in accordance with techniques herein. The command request 960 may be a request to perform an I/O operation such as may be sent from the host 810 to the data storage system 830 of FIG. 21. The command request 960 may include information such as the I/O command opcode 960a indicating whether this is a read or write operation, the particular logical address (e.g., the logical device 960b and location 960c on the logical device) to which this I/O is directed, metadata 960d identifying the snapshot version to be accessed when servicing the I/O operation, and the like. The different pieces of information in 960 may be included in various fields of the command request as may vary with the particular layout of the structure for 960 used in an embodiment. For example, in at least one embodiment, the metadata 960d may be included in a header or control portion of the command request.

An embodiment of a data storage system in accordance with techniques herein may use a cache to cache I/O operation data. As known in the art, caching may be performed in efforts to accelerate I/O performance on the basis that accessing and storing data from the cache takes less time than retrieving and storing data on non-volatile backend physical storage, such as storage devices 36a-c of FIG. 1. In at least one embodiment, a read operation received at a data storage system may be serviced as follows. A determination may be made as to whether the requested data is in cache thereby resulting in a cache hit. If so the read may be serviced using the cached copy of the requested read data. Otherwise, if the requested read data is not in cache resulting in a read miss, the requested read data is retrieved from the backend physical storage, stored in the cache, and then returned to the host or other requester that issued the read operation.

In at least one embodiment, a write operation directed to a target location where the write is received at a data storage system may be serviced as follows. A determination may be made as to whether there is already a cache slot including an existing version of data for the target location. If so, the write data may be stored in the cache slot and an acknowledgement regarding write I/O completion may be returned to the host or other requester that issued the write operation. If there is currently no cache slot including a current version of data for the target location, a cache slot may be allocated and the write data stored in the cache slot. Once the write data is written to cache, an acknowledgement regarding write I/O completion may be returned as described above. At some later point in time, the write data may be destaged from the cache where the write data is written out to the backend physical storage.

Consistent with discussion elsewhere herein, I/O operations may be directed to a logical device and location on the logical device. Mapping information as maintained on the data storage system may be used to map the logical device and location to its corresponding physical location where the data is stored.

Figure 24:
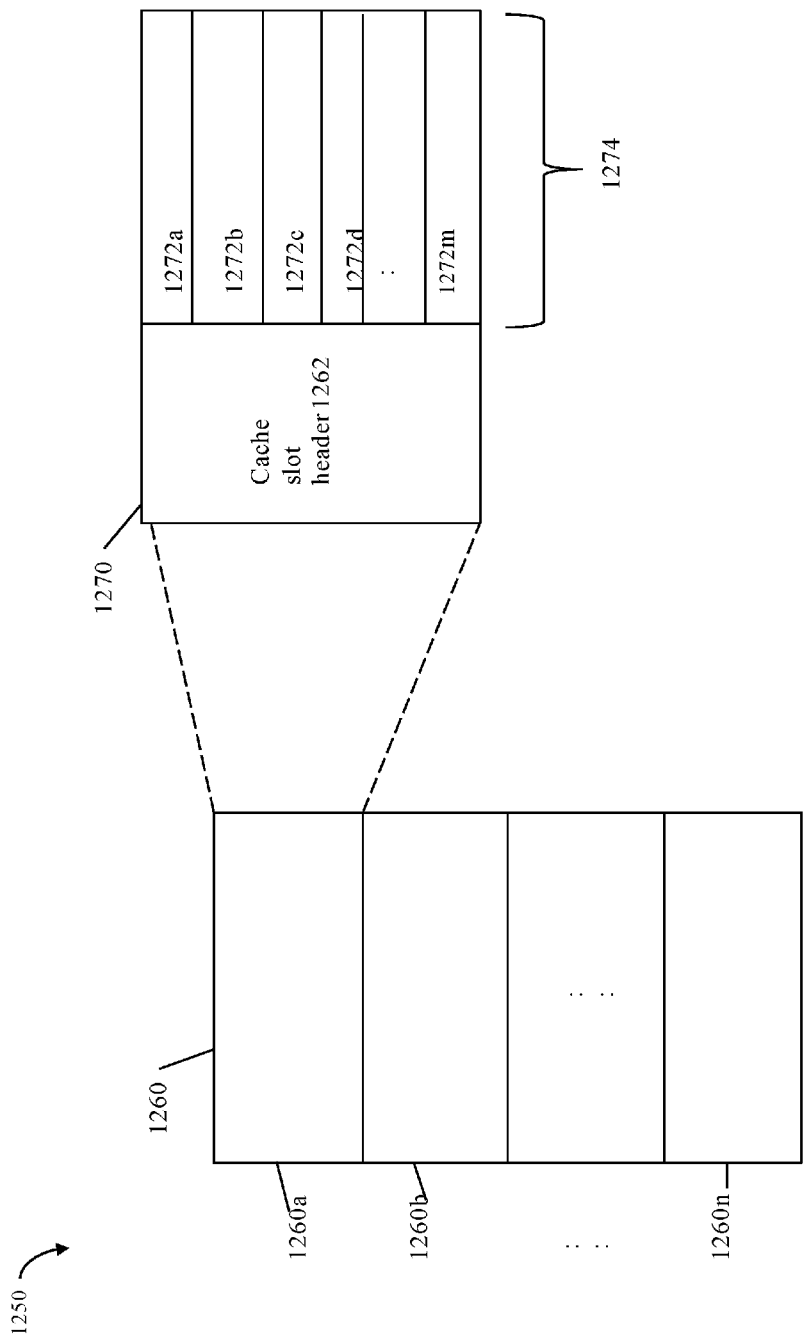
FIG. 24 is an example illustrating a logical representation of a cache in an embodiment in accordance with techniques herein.

Referring to FIG. 24, shown is an example illustrating a logical representation of a cache that may be used in an embodiment in accordance with techniques herein. In the example 1250, element 1260 may represent the memory or storage used as the cache which is partitioned into cache pages or slots 1260a-1260n. It should be noted that the example 1250 is a logical representation of a cache that may be implemented using any suitable data structure(s) known in the art. Each of the cache slots 1260a-n may contain varying amounts of write pending data. Consistent with description elsewhere herein, write pending data may be user data received in connection with a write operation where the user data has been stored in cache and is waiting to be destaged or written out to physical storage from cache. Element 1270 provides additional detail of single cache slot 1260a. Cache slot 1260a may include a cache slot header 1262 and cache slot data 1274. The cache slot data 1274 illustrates that a single cache slot of data may further include multiple portions 1272a-m each of which may or may not include write pending data and each of which may or may not include any cached data. The cache slot header 1262 may include additional information regarding the cached data stored in 1274. For example, the header 272 may denote whether the data cached in each of the portions 272a-m is write pending data.

It should be noted that the particular granularity or smallest unit of storage for storing cached data may vary with embodiment. For example, each of the portions 1272a-m may denote a smallest unit of storage for storing cached data. Additionally, the particular number of portions in a cache slot may also vary with embodiment.

An embodiment may store additional information for each of the cache slots regarding the data stored in area 1274 of each such cache slot. For example, for a cache slot including data for a particular logical device and offset or location on the logical device, such additional information may identify the offset or location on the logical device.

In an embodiment in accordance with techniques herein, the cached in connection with read and write operations may be data stored at particular logical device locations of a source device or a snapshot of the source device. Therefore, in an embodiment in accordance with techniques herein, a cache slot allocated for storing contents of a particular logical device may be further tagged with a snapshot version or identifier depending on the particular data stored in the cache slot. In this manner, a set of cache slots may be identified which are not only associated with a particular logical device but also a particular snapshot of a logical device. A cache slot including cached data for a snapshot of a logical device may have a snapshot version or identifier stored in the cache slot header or other suitable location.

It should be noted that SDDF described above is one technique that may be used in connection with determining each point in time version of a source device. More generally, any suitable technique may be used. For example, different versions of snapshots may be determined by marking a version number on each track being written. For each saved track in the snapshot, a corresponding version number indicating the version being saved for this snapshot may also be saved. To determine whether a track is changed between two snapshots, processing may compare the two saved version numbers for the track in these two snapshots. If the two saved version numbers differ, then the track is different in these two snapshots. If the two saved version numbers are the same (or they share the same metadata), then the track is not changed between these two snapshots.

In an embodiment in accordance with techniques herein in which a logical data corruption or error occurs, for example, in a database having it data stored on the data storage system, a customer may execute code that performs database repairs to correct the corrupted data. The code performing the repairs may issue I/O operations directed to a consistent snapshot set by issuing I/Os to the source devices where such I/Os may be redirected to the consistent snapshot set (e.g., particular point in time version of the source devices having the corruption requiring correction). Additionally, I/Os issued by other applications of the system may continue to access uncorrupted versions of the source devices, such as the current version of the source devices or another uncorrupted point in time version of the source devices.

What will now be described are flowcharts summarizing processing discussed above.

Figure 25:
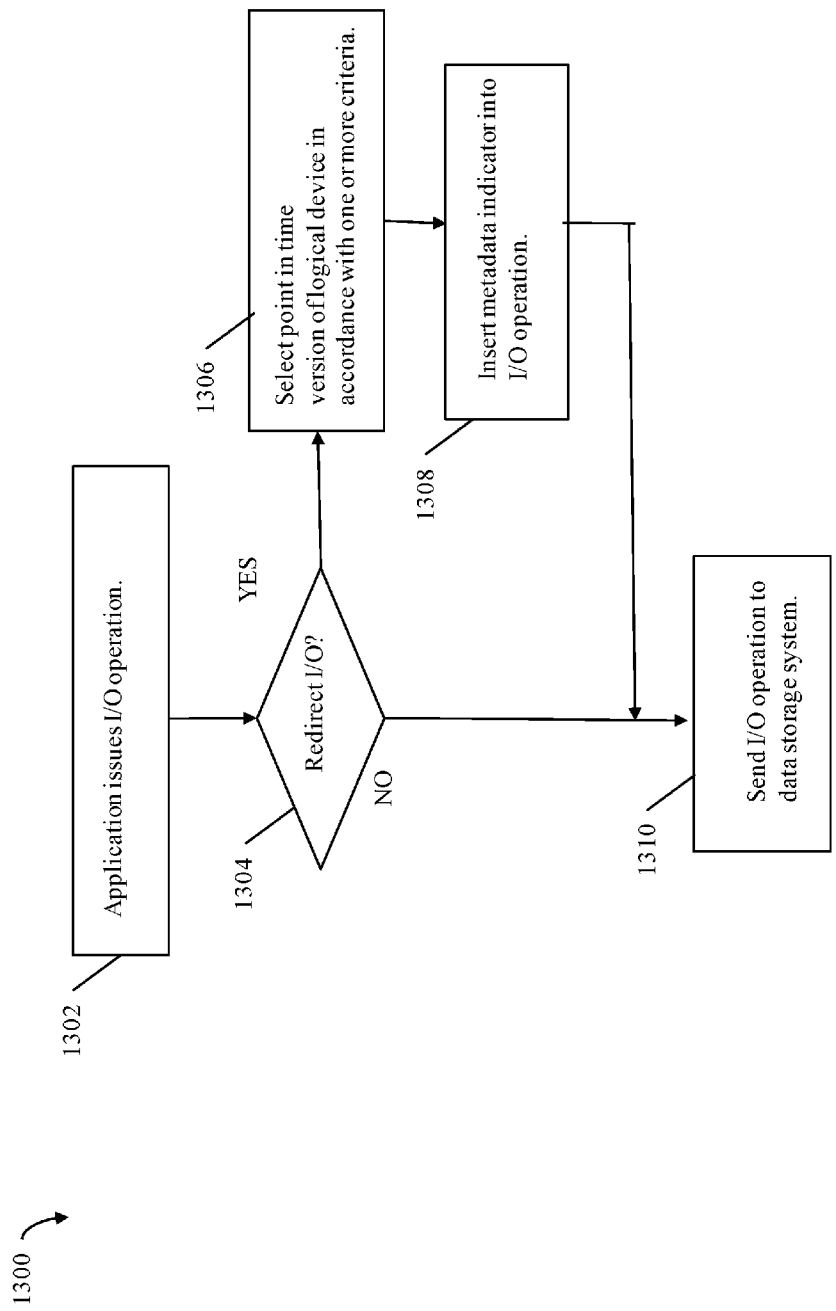
FIGS. 25-26 are flowcharts of processing steps that may be performed in an embodiment in accordance with techniques herein.

Referring to FIG. 25, shown is a flowchart 1300 of processing steps that may be performed in an embodiment in accordance with techniques herein on the host side. At step 1202, an application may issue an I/O operation to a logical device and the I/O is processed on the host side. As described above, the I/O may be processed in connection with an I/O runtime stack including a host I/O driver which determines, in accordance with one or more criteria as may be specified on the host side, whether to redirect the I/O to a snapshot of the logical device (e.g., prior point in time version of the logical device) rather than access the logical device (e.g., containing the current data version) when servicing the I/O. The criteria may be included in conditions of rules evaluated in connection with performing step 1304. If step 1304 evaluates to yes, control proceeds to step 1306 to select, in accordance with the one or more criteria, the snapshot version or point in time version of the logical device to be accessed when servicing the I/O operation. At step 1308, metadata, such as an indicator, may be inserted into the I/O operation. From step 1308, control may proceed to step 1310 to send the I/O operation to the data storage system. If step 1304 evaluates to no, control may proceed directly to step 1310.

Figure 26:
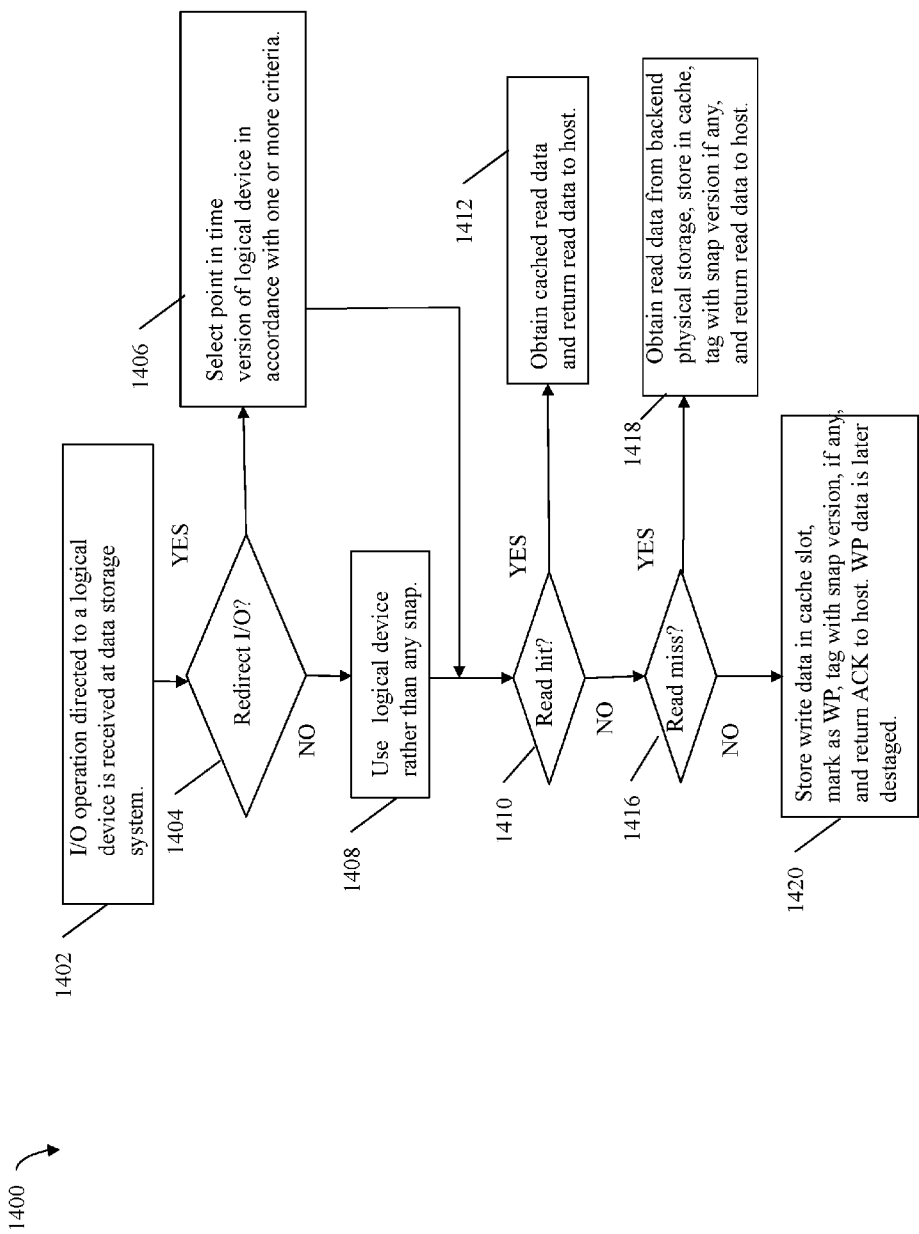

Referring to FIG. 26, shown is a flowchart 1300 of processing steps that may be performed in an embodiment in accordance with techniques herein on the data storage system. At step 1402, the I/O directed to the logical device may be received at the data storage system. At step 1404, a determination is made as to whether to redirect the I/O to a snapshot (e.g., prior point in time version) of the logical device. Step 1404 may be performed based on any metadata inserted into the I/O operation by the host. Step 1404 may also use one or more criteria such as may be embodied in rules on the data storage system side. If step 1404 evaluates to yes, control proceeds to step 1406 to select a point in time version or snapshot version of the logical device. Step 1406 may be performed based on any metadata inserted into the I/O operation by the host. Step 1406 may also use one or more criteria such as may be embodied in rules on the data storage system side. From step 1406, control proceeds to step 1410. If step 1404 evaluates to no, at step 1408 the logical device (e.g., current point in time version of the logical device) may be used rather than any snapshot of the logical device denoting a prior point in time copy of the logical device. At step 1410, a determination is made as to whether the I/O operation results in a read hit. If so, control proceeds to step 1412 to obtain the read data from cache for either the logical device (having the most current/recent version) or a selected snapshot version of the logical device as determined by prior processing steps. The read data is then returned to the host. If step 1410 evaluates to no, control proceeds to step 1416 where a determination is made as to whether the I/O operation results in a read miss. If so, control proceeds to step 1418 to obtain the read data from backend physical storage for either the logical device (e.g. source having the current version of data) or a selected snapshot version of the logical device as determined by prior processing steps. The read data is then stored in cache, tagged with the snapshot version, if any, and then returned to the host. If step 1416 evaluates to no, the I/O operation is a write operation and control proceeds to step 1420. In step 1420, the write data is stored in cache, and marked as write pending tagged with its snapshot version, if any. An acknowledgement may be returned to the host once the write data has been stored in cache. At some later point in time, the write pending data may be destaged from cache to backend physical storage to the appropriate physical location in accordance with either the logical device or a snapshot version of the logical device as determined by prior processing steps.

Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the techniques described herein will be apparent to those skilled in the art from a consideration of the specification or practice of the techniques disclosed herein. It is intended that the specification and examples be considered as exemplary only, with the true scope and spirit of the invention being indicated by the following claims.

What is claimed is:

1. A method of processing I/O operations comprising:
   creating sets of consistent point in time copies of a plurality of logical devices, wherein each of the sets includes snapshots of the plurality of logical devices at a same point in time, wherein each of the sets is associated with a different point in time and includes snapshots of the plurality of logical devices taken at a predetermined time interval on a continuous basis;
   receiving an I/O operation from an application, said I/O operation being directed to a logical device of the plurality of logical devices, the logical device having a plurality of point in time versions wherein each of the plurality of point in time versions is a snapshot of the logical device included in a different one of the sets of consistent point in time copies;
   determining, in accordance with one or more criteria, whether to direct the I/O operation to the logical device or one of the plurality of point in time versions of the logical device; and
   responsive to determining to direct the I/O operation to one of the plurality of point in time versions of the logical device, performing first processing including:
      selecting, in accordance with the one or more criteria, a first of the plurality of point in time versions of the logical device; and
      performing the I/O operation with respect to the first point in time version of the logical device.

2. The method of claim 1, further comprising:
   responsive to determining not to direct the I/O operation to one of the plurality of point in time versions of the logical device, performing the I/O operation with respect to a current version of the logical device rather than any of the plurality of point in time versions of the logical device, wherein each of the plurality of point in time versions of the logical device is a prior point in time copy of the logical device.

3. The method of claim 1, further comprising:
   selectively inserting an indicator into each of a plurality of I/O operations, said indicator indicating to perform said each I/O operation with respect to a particular one of the plurality of point in time versions of the logical device.

4. The method of claim 1, wherein said first processing includes:
   inserting, by a driver on a host, an indicator into the I/O operation, the indicator identifying the first point in time version of the logical device; and
   sending the I/O operation from the host to a data storage system, wherein said data storage system performs the I/O operation with respect to the first point in time version of the logical device identified by the indicator.

5. The method of claim 1, wherein the one or more criteria indicates to use a particular one of the plurality of point in time versions of the logical device under one or more conditions including any one or more of: if the I/O operation is issued by a particular application, if the I/O operation is issued by code executing on a particular operating system image on the host, if the I/O operation is issued by a particular host, if the I/O is received by a particular host interface unit of the data storage system, if the I/O operation is issued over a logical path included in a defined logical path group, if the I/O operation is directed to a particular logical device, if the I/O operation is directed to a particular file, if the I/O operation is directed to a particular data set, if the I/O operation is directed to a particular extent of a file, if the I/O operation is a read operation, if the I/O operation is a write operation, and if the I/O operation is directed to a particular logical device and the I/O is also sent by a particular host or host operating system image over a logical path to a particular host interface unit of the data storage system.

6. The method of claim 1, wherein the application is executing on a host and the method includes sending the I/O operation from the host to a data storage system.

7. The method of claim 6, wherein said data storage system performs said selecting that selects the first point in time version of the logical device.

8. The method of claim 6, wherein the host performs said selecting that selects the first point in time version of the logical device.

9. The method of claim 6, wherein it is determined to direct the I/O operation to the first point in time version of the logical device, and the method includes:
   storing first data of the I/O operation in a cache slot associated with the first logical device; and
   marking the cache slot as including data associated with the first point in time version of the logical device.

10. A non-transitory computer readable medium comprising code stored thereon that, when executed, performs a method of processing I/O operations comprising:
   creating sets of consistent point in time copies of a plurality of logical devices, wherein each of the sets includes snapshots of the plurality of logical devices at a same point in time, wherein each of the sets is associated with a different point in time and includes snapshots of the plurality of logical devices taken at a predetermined time interval on a continuous basis;

receiving an I/O operation from an application, said I/O operation being directed to a logical device of the plurality of logical devices, the logical device having a plurality of point in time versions wherein each of the plurality of point in time versions is a snapshot of the logical device included in a different one of the sets of consistent point in time copies;

determining, in accordance with one or more criteria, whether to direct the I/O operation to the logical device or one of the plurality of point in time versions of the logical device; and responsive to determining to direct the I/O operation to one of the plurality of point in time versions of the logical device, performing first processing including:
selecting, in accordance with the one or more criteria, a first of the plurality of point in time versions of the logical device; and
performing the I/O operation with respect to the first point in time version of the logical device.

11. The non-transitory computer readable medium of claim 10, wherein the method further comprises:
responsive to determining not to direct the I/O operation to one of the plurality of point in time versions of the logical device, performing the I/O operation with respect to the logical device rather than any of the plurality of point in time versions of the logical device.

12. The non-transitory computer readable medium of claim 10, further comprising:
selectively inserting an indicator into each of a plurality of I/O operations, said indicator indicating to perform said each I/O operation with respect to a particular one of the plurality of point in time versions of the logical device.

13. The non-transitory computer readable medium of claim 10, wherein said first processing includes:
inserting, by a driver on a host, an indicator into the I/O operation, the indicator identifying the first point in time version of the logical device; and
sending the I/O operation from the host to a data storage system, wherein said data storage system performs the I/O operation with respect to the first point in time version of the logical device identified by the indicator.

14. The non-transitory computer readable medium of claim 10, wherein the one or more criteria indicates to use a particular one of the plurality of point in time versions of the logical device under one or more conditions including any one or more of: if the I/O operation is issued by a particular application, if the I/O operation is issued by code executing on a particular operating system image on the host, if the I/O operation is issued over a logical path included in a defined logical path group, if the I/O operation is directed to a particular logical device, if the I/O operation is directed to a particular file, if the I/O operation is directed to a particular data set, if the I/O operation is directed to a particular extent of a file, if the I/O operation is a read operation, and if the I/O operation is a write operation.

15. The non-transitory computer readable medium of claim 10, wherein the application is executing on a host and the method includes sending the I/O operation from the host to a data storage system.

16. The non-transitory computer readable medium of claim 15, wherein said data storage system performs said selecting that selects the first point in time version of the logical device.

17. The non-transitory computer readable medium of claim 15, wherein the host performs said selecting that selects the first point in time version of the logical device.

18. The non-transitory computer readable medium of claim 15, wherein it is determined to direct the I/O operation to the first point in time version of the logical device, and the method includes:
storing first data of the I/O operation in a cache slot associated with the first logical device; and
marking the cache slot as including data associated with the first point in time version of the logical device.

19. A system comprising:
a processor; and
a memory comprising code stored thereon that, when executed, performs a method of processing I/O operations comprising:
creating sets of consistent point in time copies of a plurality of logical devices, wherein each of the sets includes snapshots of the plurality of logical devices at a same point in time, wherein each of the sets is associated with a different point in time and includes snapshots of the plurality of logical devices taken at a predetermined time interval on a continuous basis;
receiving an I/O operation from an application, said I/O operation being directed to a logical device of the plurality of logical devices, the logical device having a plurality of point in time versions wherein each of the plurality of point in time versions is a snapshot of the logical device included in a different one of the sets of consistent point in time copies;
determining, in accordance with one or more criteria, whether to direct the I/O operation to the logical device or one of the plurality of point in time versions of the logical device; and
responsive to determining to direct the I/O operation to one of the plurality of point in time versions of the logical device, performing first processing including:
selecting, in accordance with the one or more criteria, a first of the plurality of point in time versions of the logical device; and
performing the I/O operation with respect to the first point in time version of the logical device.

20. The system of claim 19, wherein the one or more criteria indicates to use a particular one of the plurality of point in time versions of the logical device under one or more conditions including any one or more of: if the I/O operation is issued by a particular application, if the I/O operation is issued by code executing on a particular operating system image on the host, if the I/O operation is issued by a particular host, if the I/O is received by a particular host interface unit of the data storage system, if the I/O operation is issued over a logical path included in a defined logical path group, if the I/O operation is directed to a particular logical device, if the I/O operation is directed to a particular file, if the I/O operation is directed to a particular data set, if the I/O operation is directed to a particular extent of a file, if the I/O operation is a read operation, if the I/O operation is a write operation, and if the I/O operation is directed to a particular logical device and the I/O is also sent by a particular host or host operating system image over a logical path to a particular host interface unit of the data storage system.

* * * * *